United States Patent
Park et al.

(10) Patent No.: US 12,038,585 B2
(45) Date of Patent: Jul. 16, 2024

(54) OPTICAL DEVICE AND METHOD OF MANUFACTURING THE SAME

(71) Applicant: SAMSUNG DISPLAY CO., LTD., Yongin-si (KR)

(72) Inventors: Jeong Woo Park, Yongin-si (KR); Jae Joong Kwon, Suwon-si (KR); Ju Hwa Ha, Seoul (KR); Hyun Jin Cho, Seoul (KR); Su Bin Jung, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/937,709

(22) Filed: Oct. 3, 2022

(65) Prior Publication Data
US 2023/0021508 A1    Jan. 26, 2023

Related U.S. Application Data

(62) Division of application No. 16/430,310, filed on Jun. 3, 2019, now Pat. No. 11,467,404.

(30) Foreign Application Priority Data

Jul. 18, 2018  (KR) .......................... 10-2018-0083566

(51) Int. Cl.
*G02B 27/01* (2006.01)
*G02B 17/08* (2006.01)

(52) U.S. Cl.
CPC ..... *G02B 27/0172* (2013.01); *G02B 17/0856* (2013.01); *G02B 2027/0123* (2013.01)

(58) Field of Classification Search
CPC .......... G02B 27/0172; G02B 17/0856; G02B 2027/0123; G02B 2027/0125; G02B 2027/0178; G02B 2027/0194
See application file for complete search history.

(56) References Cited

U.S. PATENT DOCUMENTS

| | | | |
|---|---|---|---|
| 8,384,999 B1 * | 2/2013 | Crosby | G02B 27/0172 359/410 |
| 9,237,338 B1 | 1/2016 | Maguire, Jr. | |
| 9,442,291 B1 * | 9/2016 | Martinez | G02B 27/0172 |
| 9,761,051 B2 | 9/2017 | Bromer | |
| 10,473,943 B1 * | 11/2019 | Hughes | G02B 1/11 |
| 11,099,390 B2 * | 8/2021 | Kim | G06T 19/006 |
| 2010/0149073 A1 | 6/2010 | Chaum et al. | |
| 2011/0249087 A1 | 10/2011 | Tsang et al. | |

(Continued)

FOREIGN PATENT DOCUMENTS

| | | |
|---|---|---|
| CN | 106855655 A | 6/2017 |
| KR | 10-2016-0109021 | 9/2016 |

(Continued)

*Primary Examiner* — Collin X Beatty
(74) *Attorney, Agent, or Firm* — Lewis Roca Rothgerber Christie LLP

(57) ABSTRACT

An augmented reality providing apparatus is provided. The augmented reality providing apparatus includes a lens including a first lens portion including a first reflective member, and a second lens portion including a second reflective member, and a display device on one side of the lens for displaying first and second images, wherein the first reflective member reflects the first image at a first angle, and the second reflective member reflects the second image at a second angle that is different from the first angle.

10 Claims, 29 Drawing Sheets

(56) References Cited

U.S. PATENT DOCUMENTS

| | | | |
|---|---|---|---|
| 2015/0219899 A1 | 8/2015 | Mack et al. | |
| 2017/0235142 A1 | 8/2017 | Wall et al. | |
| 2018/0011322 A1* | 1/2018 | Leighton | G02B 27/0172 |
| 2019/0204601 A1* | 7/2019 | Ha | G02B 27/0172 |
| 2020/0081251 A1* | 3/2020 | Mohammed | G02B 27/144 |
| 2023/0251493 A1* | 8/2023 | Ha | B29D 11/0073 |
| | | | 156/278 |

FOREIGN PATENT DOCUMENTS

| | | |
|---|---|---|
| KR | 10-1660519 B1 | 9/2016 |
| KR | 10-1830364 B1 | 2/2018 |
| KR | 10-2018-0028339 | 3/2018 |
| TW | 201723584 A | 7/2017 |
| TW | 201802536 A | 1/2018 |

\* cited by examiner

OPTICAL DEVICE AND METHOD OF MANUFACTURING THE SAME

CROSS-REFERENCE TO RELATED APPLICATIONS

This application is a divisional of U.S. patent application Ser. No. 16/430,310, filed Jun. 3, 2019, which claims priority to and the benefit of Korean Patent Application No. 10-2018-0083566, filed Jul. 18, 2018, the entire content of both of which is incorporated herein by reference.

BACKGROUND

1. Field

The present disclosure relates to an optical device, and a method of manufacturing the same.

2. Description of the Related Art

Augmented reality (AR) refers to a technique of superimposing a virtual image (e.g., a computer generated image) on a real image seen by the eyes of a user, and displaying the two images as a single image. The virtual image may be an image in the form of text or graphics, and the actual image may be information regarding real objects that can be observed from the field of view (FOV) of an augmented reality device.

Augmented reality can be implemented using a head-mounted display (HMD), a head-up display (HUD), or the like. When augmented reality is implemented using a head-mounted display, the head-mounted display can be provided in the form of glasses, and can thus be easily carried around, and easily worn or removed, by a user. In this case, a display device that provides a virtual image for realizing augmented reality can be implemented using a micro-display, such as an organic light-emitting diode-on-silicon (OLEDoS) display, or a liquid crystal-on-silicon (LCOS) display. Recently, there have been demands for widening a part of the display device that can be seen by the eyes of a user (i.e., widening the field of view of the user).

SUMMARY

Embodiments of the present disclosure provide an augmented reality (AR) providing apparatus (an AR-providing apparatus) capable of widening a part of a display device that can be seen by the eyes of a user (i.e., the field of view (FOV) of the user), and a method of manufacturing the augmented reality providing apparatus. To this end, a plurality of micro-displays may be suitable.

According to an aspect of the present invention, there is provided an augmented reality providing apparatus including a lens including a first lens portion including a first reflective member, and a second lens portion including a second reflective member, and a display device on one side of the lens for displaying first and second images, wherein the first reflective member reflects the first image at a first angle, and the second reflective member reflects the second image at a second angle that is different from the first angle.

The lens may further include a third lens portion including a third reflective member, wherein the display device is further for displaying a third image, and wherein the third reflective member reflects the third image at a third angle that is different from the first and second angles.

The first, second, and third lens portions may be sequentially arranged in a first direction that is a thickness direction of the lens.

The first, second, and third reflective members may overlap one another in a first direction that is a thickness direction of the lens.

The first, second, and third reflective members may be spaced apart from one another along a second direction that is a width direction of the lens.

The first, second, and third reflective members may be inclined at different angles.

The display device may include first, second, and third display panels for displaying the first, second, and third images, respectively.

According to another aspect of the present invention, there is provided an augmented reality providing apparatus including a first lens portion defining a first groove, a first reflective member in the first groove and having a concave shape, and a display device on one side of the first lens portion for displaying a first image, wherein the first reflective member reflects the first image at a first angle.

The first groove may have a diameter of about 400 µm to about 2 mm.

The first reflective member may have a diameter of about 100 µm to about 5 mm.

The first groove may have a surface roughness of about 20 nm to about 40 nm.

Residual stress at an inflection point where the first groove and a top surface of the first lens portion meet may be about 4 MPa to about 6 MPa.

The augmented reality providing apparatus my further include a second lens portion overlapping with the first lens portion and defining a second groove.

The augmented reality providing apparatus my further include a second reflective member in the second groove, and having a concave shape.

The first and second reflective members may be inclined at different angles.

The augmented reality providing apparatus my further include a third lens portion overlapping with the first and second lens portions, and including a third micro-lens having a flat shape.

The augmented reality providing apparatus my further include a third lens portion overlapping with the first lens portion and the second lens portion, and defining a third groove, and a third reflective member in the third groove, and having a concave shape, wherein the first, second, and third reflective members have different diameters.

According to still another aspect of the present invention, there is provided a method of manufacturing an augmented reality providing apparatus, the method including heating a part of a top surface of a lens corresponding to a region in which to form a groove, and forming the groove on the top surface of the lens by cooling the lens, wherein the heating the part of the top surface of the lens includes heating an induction heating element, and placing the heated induction heating element in contact with the part of the top surface of the lens corresponding to the region in which to form the groove for about 0.1 seconds to about 1 second.

The forming the groove on the top surface of the lens may include cooling the top surface of the lens to a temperature of about −200° C. to about 0° C. to peel off the part of the top surface of the lens corresponding to the region in which to form the groove, and removing the part of the top surface of the lens that is peeled off.

The method may further include forming a reflective member along the groove.

According to the aforementioned and other embodiments of the present disclosure, a part of the display device that can be seen by the eyes of a user (i.e., a part of the display device corresponding to the field of view of the user) can be widened.

Other features and embodiments may be apparent from the following detailed description, the drawings, and the claims.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

Figure 1:
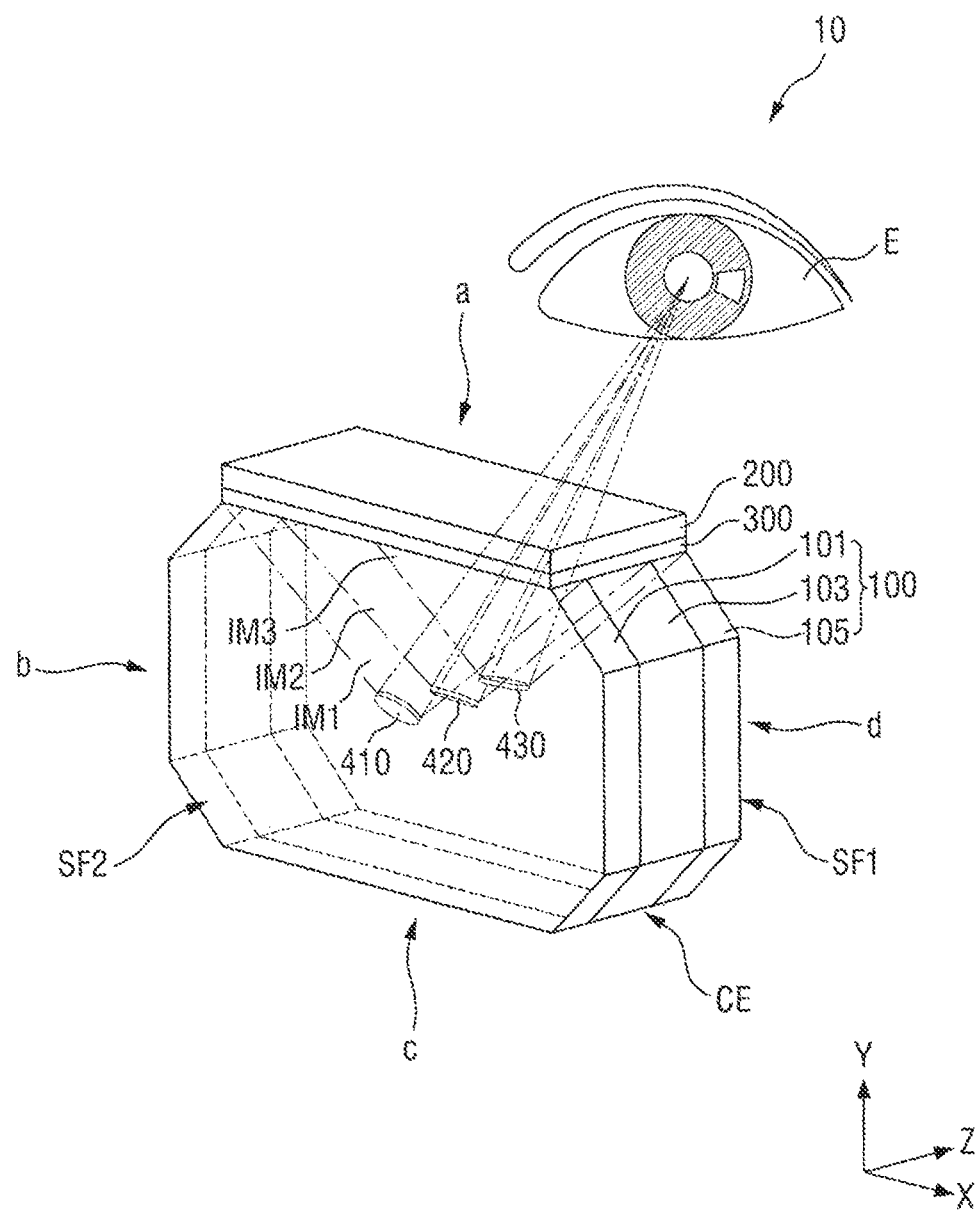
FIG. 1 is a perspective view of an augmented reality (AR) providing apparatus according to an embodiment of the present disclosure.

Features of the inventive concept and methods of accomplishing the same may be understood more readily by reference to the following detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present invention.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

In the following examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
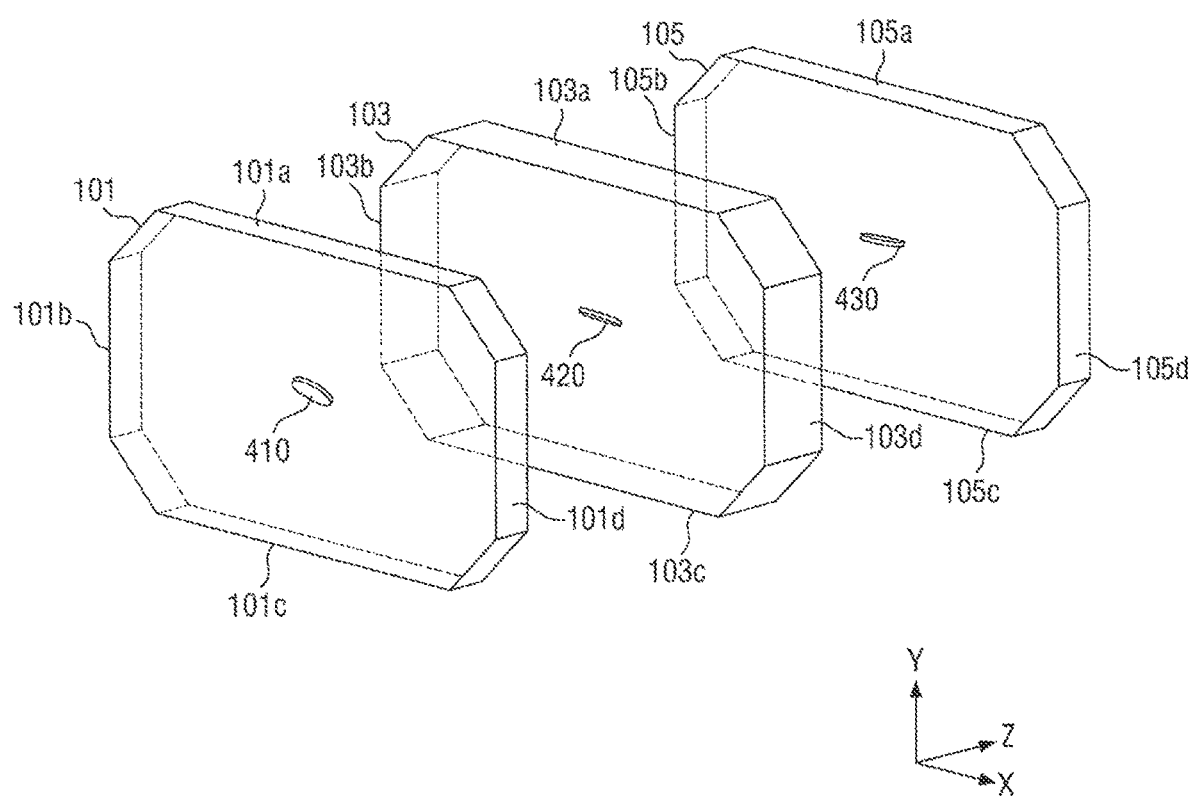
FIG. 2 is an exploded perspective view of a lens of an augmented reality providing apparatus according to an embodiment of the present disclosure.

FIG. 1 is a perspective view of an augmented reality (AR) providing apparatus according to an embodiment of the present disclosure, and FIG. 2 is an exploded perspective view of a lens of an augmented reality providing apparatus according to an embodiment of the present disclosure.

Referring to FIGS. 1 and 2, an augmented reality providing apparatus 10 includes a lens 100, a display device 200, and an adhesive layer 300.

The lens 100 may include a plurality of lens portions. In one embodiment, the lens 100 may include first, second, and third lens portions 101, 103, and 105, but the present disclosure is not limited thereto. For example, the lens 100 may include at least two lens portions. The lens 100 may be formed of glass or plastic to be transparent or semitransparent. Accordingly, a user can see a real image (i.e., reality) through the lens 100. The lens 100 may have a refractive index (e.g., a predetermined refractive index) in consideration of the visual acuity of the user, and the first, second, and third lens portions 101, 103, and 105 may have the same refractive index. However, the present disclosure is not limited to this. The first, second, and third lens portions 101, 103, and 105 may be bonded to one another through a bonding material. For example, the bonding material may be an optically clear resin (OCR) or an optically clear adhesive (OCA), but the present disclosure is not limited thereto.

The lens 100 is illustrated as being formed as a decahedron consisting of first and second octagonal surfaces SF1 and SF2 having their corners CE chamfered and first, second, third, and fourth sides a, b, c, and d, but may be formed in various other shapes. For example, the lens 100 may be formed as a hexahedron consisting of first and second rectangular surfaces having right-angled corners and first, second, third, and fourth sides a, b, c, and d. That is, the lens 100 may be formed as a polyhedron consisting of first and second polygonal surfaces and a number of sides, or may even be formed as a cylinder.

The first surface SF1 of the lens 100 may be a surface of the third lens portion 105, and the second surface SF2 of the lens 100 may be a surface of the first lens portion 101. That is, the first surface SF1 of the lens 100 may be a surface facing an eye E of the user, and the second surface SF2 of the lens 100 may be the outer surface of the lens 100. The lens 100 may be formed in various shapes other than a polyhedron, such as a cylinder, an elliptical cylinder, a semicircular cylinder, a semielliptical cylinder, a distorted cylinder, or a distorted semicircular cylinder. The terms "distorted cylinder" and "distorted semicircular cylinder," as used herein, refer to a cylinder and a semicircular cylinder, respectively, having a non-uniform diameter.

In one embodiment, the first, second, and third lens portions 101, 103, and 105 may have the same size, and may be bonded together in a third direction (or a Z-axis direction) to form the lens 100, but the present disclosure is not limited thereto.

The lens 100 may include first, second, and third reflective members 410, 420, and 430. For example, the first reflective member 410 may be located in the first lens portion 101, the second reflective member 420 may be located in the second lens portion 103, and the third reflective member 430 may be located in the third lens portion 105. The first, second, and third reflective members 410, 420, and 430 may also be referred to as pin mirrors or micro-mirrors, but the present disclosure is not limited thereto.

In one embodiment, the first, second, and third reflective members 410, 420, and 430 may be located in the first, second, and third lens portions 101, 103, and 105, respectively, but the present disclosure is not limited thereto. In another embodiment, a plurality of first reflective members 410 may be located in the first lens portion 101, a plurality of second reflective members 420 may be located in the second lens portion 103, and a plurality of third reflective members 430 may be located in the third lens portion 105. In order to widen a part of a display device 200 that can be perceived by the eye E of the user (i.e., to widen the field-of-view (FOV) of the user), the lens 100 may suitably include a plurality of first reflective members 410, a plurality of second reflective members 420, and a plurality of third reflective members 430. The display device 200 displays virtual images for realizing augmented reality. The display device 200 may be located on a side of the lens 100.

For example, the display device 200 may be located on the first side (e.g., side a) of the lens 100, but the present disclosure is not limited thereto. For example, the display device 200 may be located on at least one of the first, second, third, and fourth sides a, b, c, and d. The first, second, and third reflective members 410, 420, and 430 may be positioned to have different angles. The first, second, and third reflective members 410, 420, and 430 reflect the virtual images displayed by the display device 200, and thereby provide the virtual images to the eye E of the user. Because the virtual images displayed by the display device 200 are reflected by the first, second, and third reflective members 410, 420, and 430 having different angles, the depth of field of the virtual images is deepened.

For example, referring to FIG. 1, the first reflective member 410 of the first lens portion 101 provides a first image IM1 displayed by the display device 200 to the eye E of the user by reflecting the first image IM1 toward the first surface SF1 of the lens 100. The second reflective member 420 of the second lens portion 103 provides a second image IM2 displayed by the display device 200 to the eye E of the user by reflecting the second image IM2 toward the first surface SF1 of the lens 100. The third reflective member 430 of the third lens portion 105 provides a third image IM3 displayed by the display device 200 to the eye E of the user by reflecting the third image IM3 toward the first surface SF1 of the lens 100. The first, second, and third reflective members 410, 420, and 430 may allow the virtual images displayed by the display device 200 (e.g., the first, second, and third images IM1, IM2, and IM3) to be focused on a single point on the retina of the eye E of the user. As a result, even when the user focuses on the real image through the lens 100, the user can see the virtual images clearly. That is, the user can see the virtual images clearly without the need to shift his or her focus currently being placed on the real image.

The first, second, and third reflective members 410, 420, and 430 may be smaller in size than the pupil of the eye E of the user. For example, the first, second, and third reflective members 410, 420, and 430 may have a diameter of about 5 mm. In this case, because the user focuses on the real image, it is difficult for the user to recognize the first, second, and third reflective members 410, 420, and 430. However, as the size of the first, second, and third reflective members 410, 420, and 430 decreases, the luminance of the virtual images provided by the display device 200 to the eye E of the user decreases, and given this, the size of the first, second, and third reflective members 410, 420, and 430 may be appropriately set. FIG. 1 illustrates the first, second, and third reflective members 410, 420, and 430 as having a circular cross-sectional shape, but the first, second, and third reflective members 410, 420, and 430 may have an elliptical or polygonal cross-sectional shape.

In one embodiment, the first lens portion 101 may include first, second, third, and fourth sides 101a, 101b, 101c, and 101d, and may have chamfered edges CE at the corners thereof, but the present disclosure is not limited thereto. For example, the first lens portion 101 may have right-angled corners. The first reflective member 410 may be located at the center of the first lens portion 101.

The second lens portion 103 may include first, second, third, and fourth sides 103a, 103b, 103c, and 103d, and may have chamfered edges CE at the corners thereof, but the present disclosure is not limited thereto. For example, the second lens portion 103 may have right-angled corners. The second reflective member 420 may be located at the center of the second lens portion 103.

The third lens portion 105 may include first, second, third, and fourth sides 105a, 105b, 105c, and 105d, and may have chamfered edges CE at the corners thereof, but the present disclosure is not limited thereto. For example, the third lens portion 105 may have right-angled corners. The third reflective member 430 may be located at the center of the third lens portion 105.

The first, second, and third lens portions 101, 103, and 105 may have the same size in a plan view, and the first, second, and third reflective members 410, 420, and 430, which are located in the first, second, and third lens portions 101, 103, and 105, respectively, may be inclined at different angles, and may overlap with one another in the third direction (or the Z-axis direction).

Figure 3:
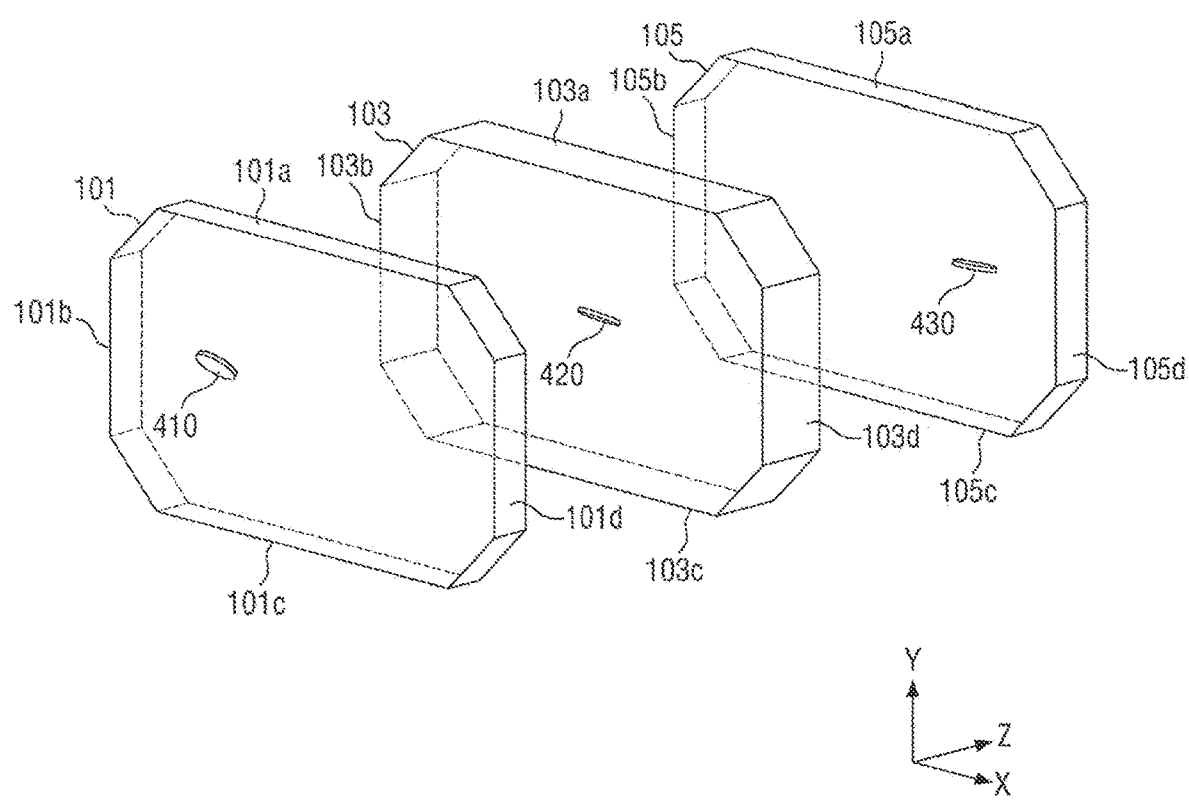
FIG. 3 is an exploded perspective view of a lens according to another embodiment of the present disclosure.

FIG. 3 is an exploded perspective view of a lens according to another embodiment of the present disclosure. Referring to FIG. 3, a first reflective member 410 of a first lens portion 101 may be located close to a second side 101b of the first lens portion 101, a second reflective member 420 of a second lens portion 103 may be located at the center of the second lens portion 103, and a third reflective member 430 of a third lens portion 105 may be located close to a fourth side 105d of the third lens portion 105. That is, the first, second, and third reflective members 410, 420, and 430, which are located in the first, second, and third lens portions 101, 103, and 105, respectively, may be inclined at different angles, and may be spaced apart from one another in a first direction (or an X-axis direction) (i.e., not aligned in the third direction/the Z-axis direction), and the first and third reflective members 410 and 430 may be symmetrical in the first direction (or the X-axis direction) with respect to the second reflective member 420. However, the present disclosure is not limited to this. For example, alternatively, the first, second, and third reflective members 410, 420, and 430, which are located in the first, second, and third lens portions 101, 103, and 105, respectively, may be inclined at different angles and may be spaced apart from one another in a second direction (or a Y-axis direction). Still alternatively, the first, second, and third reflective members 410, 420, and 430, which are located in the first, second, and third lens portions 101, 103, and 105, respectively, may be inclined at different angles, and may be spaced apart from one another in both the first direction (or the X-axis direction) and the second direction (or the Y-axis direction). Here, the first direction (or the X-axis direction) may be defined as the width direction of a lens 100, and the second direction (or the Y-axis direction) may be defined as the height direction of the lens 100.

Figure 4:
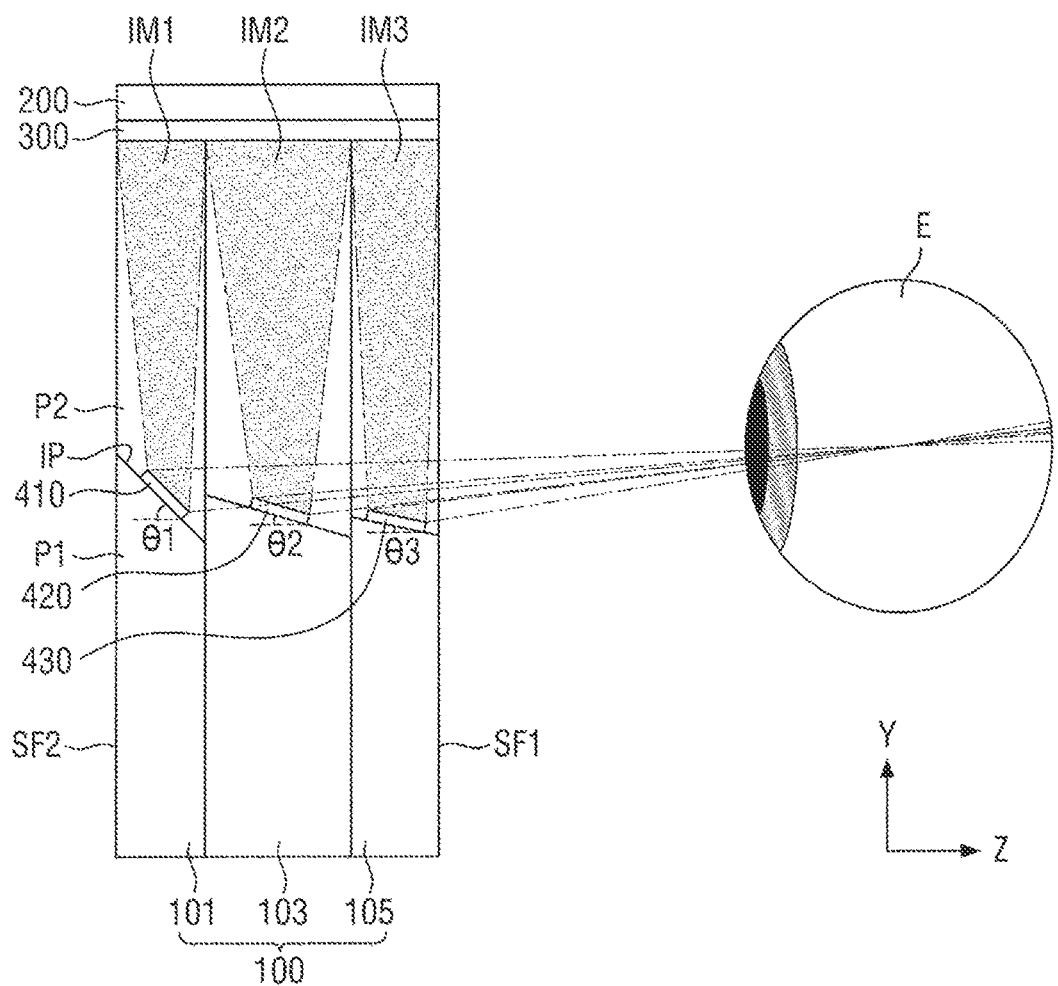
FIG. 4 is a schematic cross-sectional view of an augmented reality providing apparatus according to another embodiment of the present disclosure.

FIG. 4 is a schematic cross-sectional view of an augmented reality providing apparatus according to another embodiment of the present disclosure. Referring to FIG. 4, in one embodiment, a first reflective member 410 may be located in a first lens portion 101, a second reflective member 420 may be located in a second lens portion 103, and a third reflective member 430 may be located in a third lens portion 105.

The first, second, and third lens portions 101, 103, and 105 may have the same thickness or different thicknesses. In one embodiment, the second lens portion 103 may be thicker than the first and third lens portions 101 and 105, but the present disclosure is not limited thereto. For example, in another embodiment, the thickness of the first, second, and third lens portions 101, 103, and 105 may sequentially increase or decrease from the first lens portion 101 to the second lens portion 103 to the third lens portion 105. In yet another embodiment, some of the first, second, and third lens portions 101, 103, and 105 may have a different thickness from the rest of the first, second, and third lens portions 101, 103, and 105.

The first, second, and third reflective members 410, 420, and 430 may be located in parallel to one another in the thickness direction of a lens 100 (i.e., in a third direction/ Z-axis direction), but the present disclosure is not limited thereto. For example, the first, second, and third reflective members 410, 420, and 430 may be located at different heights. In other words, the first, second, and third reflective members 410, 420, and 430 may be located at different locations in the height direction of the lens 100 (i.e., in a second direction/Y-axis direction).

For example, the height of, or the locations in the height direction of, the first, second, and third reflective members 410, 420, and 430 may sequentially increase or decrease from the first reflective member 410 to the second reflective member 420 to the third reflective member 430, while only some of the first, second, and third reflective members 410, 420, and 430 may have a different height from, or different height location from, the rest of the first, second, and third reflective members 410, 420, and 430.

A first inclination angle θ1 of the first reflective member 410 may be set such that the first reflective member 410 is able to reflect and thereby provide a first image IM1 of a display device 200 to an eye E of a user. A second inclination angle θ2 of the second reflective member 420 may be set such that the second reflective member 420 is able to reflect and thereby provide a second image IM2 of the display device 200 to the eye E of the user. A third inclination angle θ3 of the third reflective member 430 may be set such that the third reflective member 430 is able to reflect and thereby provide a third image IM3 of the display device 200 to the eye E of the user.

The first, second, and third inclination angles 81, 82, and 83 refer to the angles at which the first, second, and third reflective members 410, 420, and 430 are inclined toward the second direction (or the Y-axis direction) with respect to the thickness direction of the lens 100 (i.e., the third direction/Z-axis direction). In one embodiment, the first, second, and third inclination angles 81, 82, and 83 of the first, second, and third reflective members 410, 420, and 430 may be set to differ from one another. For example, the second inclination angle θ2 of the second reflective member 420 may be set to be smaller than the first inclination angle θ1 of the first reflective member 410, and the third inclination angle θ3 of the third reflective member 430 may be set to be greater than the second inclination angle θ2 of the second reflective member 420. Also for example, only two of the first, second, and third reflective members 410, 420, and 430 may be set to have the same inclination angle. For example, the first and second inclination angles θ1 and θ2 of the first and second reflective members 410 and 420 may be set to be the same, and the third inclination angle θ3 of the third reflective member 430 may be set to be smaller than the first and second inclination angles θ1 and θ2 of the first and second reflective members 410 and 420.

The first, second, and third inclination angles 81, 82, and 83 of the first, second, and third reflective members 410, 420, and 430 may be set depending on the angles of inclination planes IP of the first, second, and third lens portions 101, 103, and 105. Each of the first, second, and third lens portions 101, 103, and 105 may be divided into first and second parts P1 and P2, and the interface between the first and second parts P1 and P2 may be defined as an inclination plane IP. Because the first, second, and third reflective members 410, 420, and 430 are mounted on the inclination planes IP of the first, second, and third lens portions 101, 103, and 105, respectively, the first, second, and third inclination angles 81, 82, and 83 of the first, second, and third reflective members 410, 420, and 430 may be determined by the inclination planes IP of the first, second, and third lens portions 101, 103, and 105. Because the lens 100 is formed by the first, second, and third lens portions 101, 103, and 105, the inclination planes IP of the first, second, and third reflective members 410, 420, and 430 may be set to differ from one another, and as a result, the first, second, and third inclination angles 81, 82, and 83 of the first, second, and third reflective members 410, 420, and 430 may be set to differ from one another. Accordingly, the first, second, and third images IM1, IM2, and IM3 output by the display device 200 can be effectively focused on a single point or area on the retina of the eye E of the user.

In a case where each of the first, second, and third reflective members 410, 420, and 430 consists of a plurality of mirrors, the mirrors of the first reflective member 410 may be set to have the same inclination angle as one another (i.e., the first inclination angle θ1), the mirrors of the second reflective member 420 may be set to have the same inclination angle as one another (i.e., the second inclination angle 82), the mirrors of the third reflective member 430 may be set to have the same inclination angle as one another (i.e., the third inclination angle θ3), and the first, second, and third inclination angles 81, 82, and 83 may be set to differ from one another. However, the present disclosure is not limited to this. For example, alternatively, the mirrors of the first reflective member 410 may be set to have different inclination angles than each other, the mirrors of the second reflective member 420 may be set to have different inclination angles than each other, and the mirrors of the third reflective member 430 may be set to have different inclination angles than each other. Still alternatively, the mirrors of the first reflective member 410 may be set to have different inclination angles, and the mirrors of the third reflective member 430 may be set to have different inclination angles, while the mirrors of the second reflective member 420 may be set to have the same inclination angle.

Figure 5:
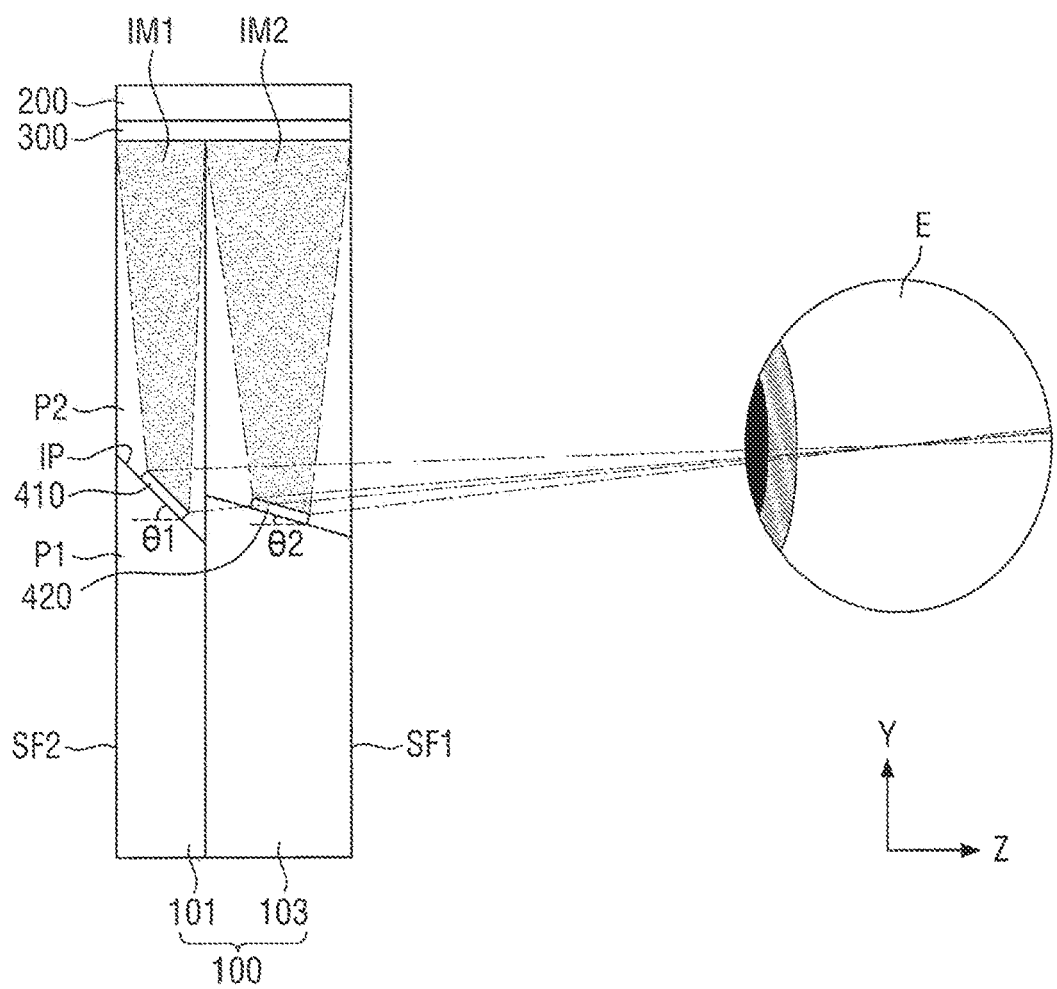
FIG. 5 is a schematic cross-sectional view of an augmented reality providing apparatus according to another embodiment of the present disclosure.

FIG. 5 is a schematic cross-sectional view of an augmented reality providing apparatus according to another embodiment of the present disclosure. Referring to FIG. 5, a first reflective member 410 may be located in a first lens portion 101, a second reflective member 420 may be located in a second lens portion 103, and a lens 100 may be formed by the first and second lens portions 101 and 103. A first inclination angle θ1 of the first reflective member 410 included in the first lens portion 101 may be set to enable the first reflective member 410 to reflect and thereby provide a first image IM1 of a display device 200 to an eye E of a user. A second inclination angle θ2 of the second reflective member 420 included in the second lens portion 103 may be to enable the second reflective member 420 to reflect and thereby provide a second image IM2 of the display device 200 to the eye E of the user. The first and second inclination angles θ1 and θ2 of the first and second reflective members 410 and 420 may be set to differ from each other. For example, the second inclination angle θ2 of the second reflective member 420 may be set to be smaller than the first inclination angle θ1 of the first reflective member 410, and the difference between the first and second inclination angles θ1 and θ2 may be greater than that depicted in the example of FIG. 4. However, the present disclosure is not limited to this.

The display device 200 may be a flexible display device that has flexibility and can thus be bent. For example, the display device 200 may be a flexible organic light-emitting diode (OLED) display device, but the present disclosure is not limited thereto. The display device 200 will be described later in detail. An adhesive layer 300 adheres the lens 100 and the display device 200 together.

The adhesive layer 300 may be formed as an optically clear resin film or an optically clear adhesive film. As already mentioned above, the augmented reality providing apparatus 10 can provide a real image to the eye E of the user through the lens 100, and can also provide virtual images output by the display device 200 through the first, second, and third reflective members 410, 420, and 430 to the eye E of the user. That is, the virtual images may be superimposed on the real image, and the images may then be perceived by the eye E of the user as a single image. In the augmented reality providing apparatus 10, the lens 100 consists of the first, second, and third lens portions 101, 103, and 105, and the first, second, and third reflective members 410, 420, and 430 are located in the first, second, and third lens portions 101, 103, and 105, respectively, at different inclination angles (i.e., the first, second, and third inclination angles 81, 82, and 83, respectively).

Thus, the virtual images output by the display device 200 can fall on the eye E of the user through the first, second, and third reflective members 410, 420, and 430. Accordingly, even images that fall beyond the retina of the eye E of the user can be reflected toward the retina of the eye E of the user, and as a result, the field of view of the user can be widened.

Also, a micro-display, such as an organic light-emitting diode-on-silicon (OLEDoS) display or a liquid crystal-on-silicon (LCOS) display, realizes colors by forming color filters on an organic light-emitting layer that emits white light, and can thus realize high luminance. On the other hand, the display device 200 of the augmented reality providing apparatus 10 can use red, green, and blue organic light-emitting layers. Thus, because there is no need to use color filters, the display device 200 may provide useful differences over an organic light-emitting diode-on-silicon with respect to realizing luminance.

Figure 6:
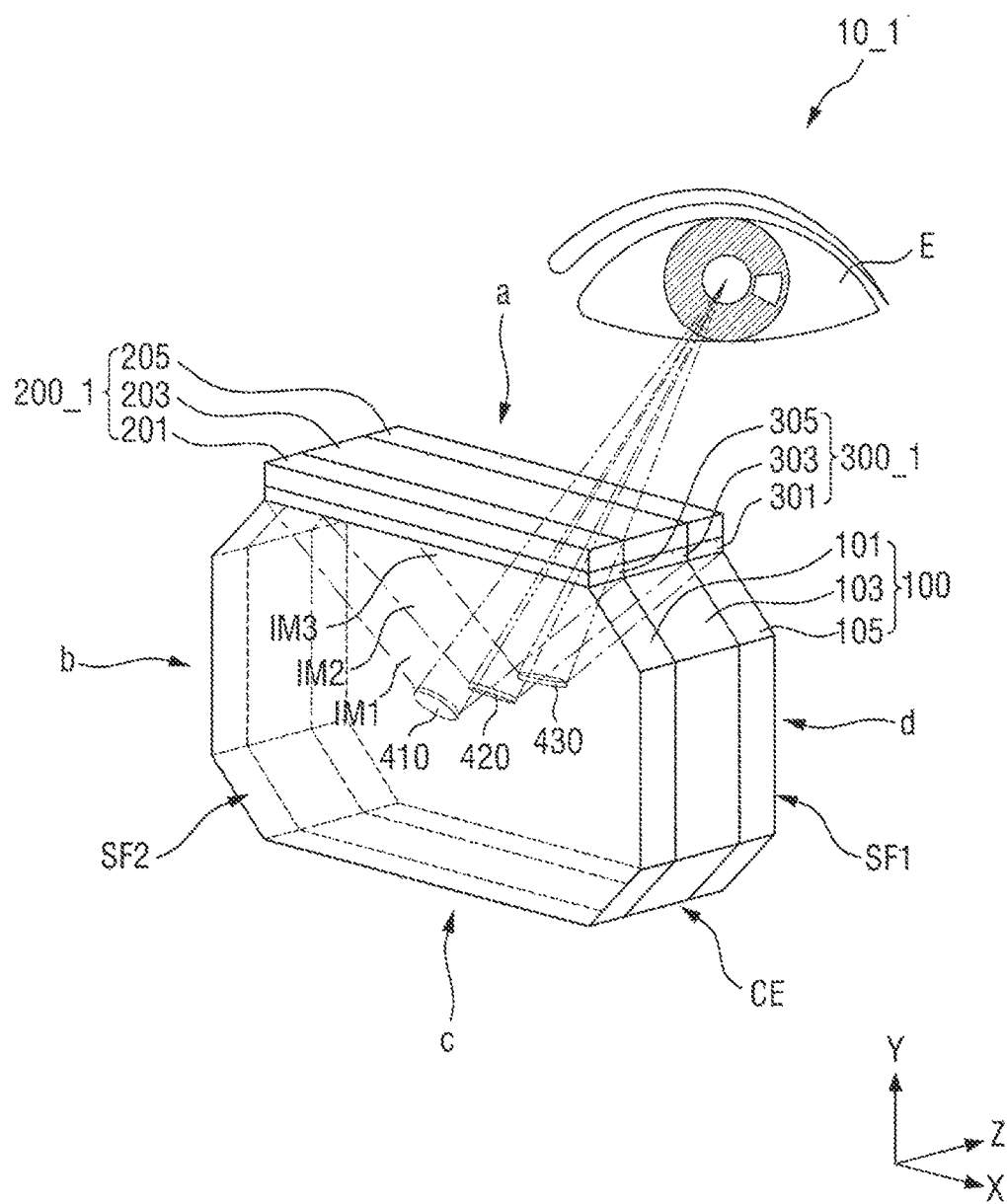
FIG. 6 is a perspective view of an augmented reality providing apparatus according to another embodiment of the present disclosure.
Figure 7:
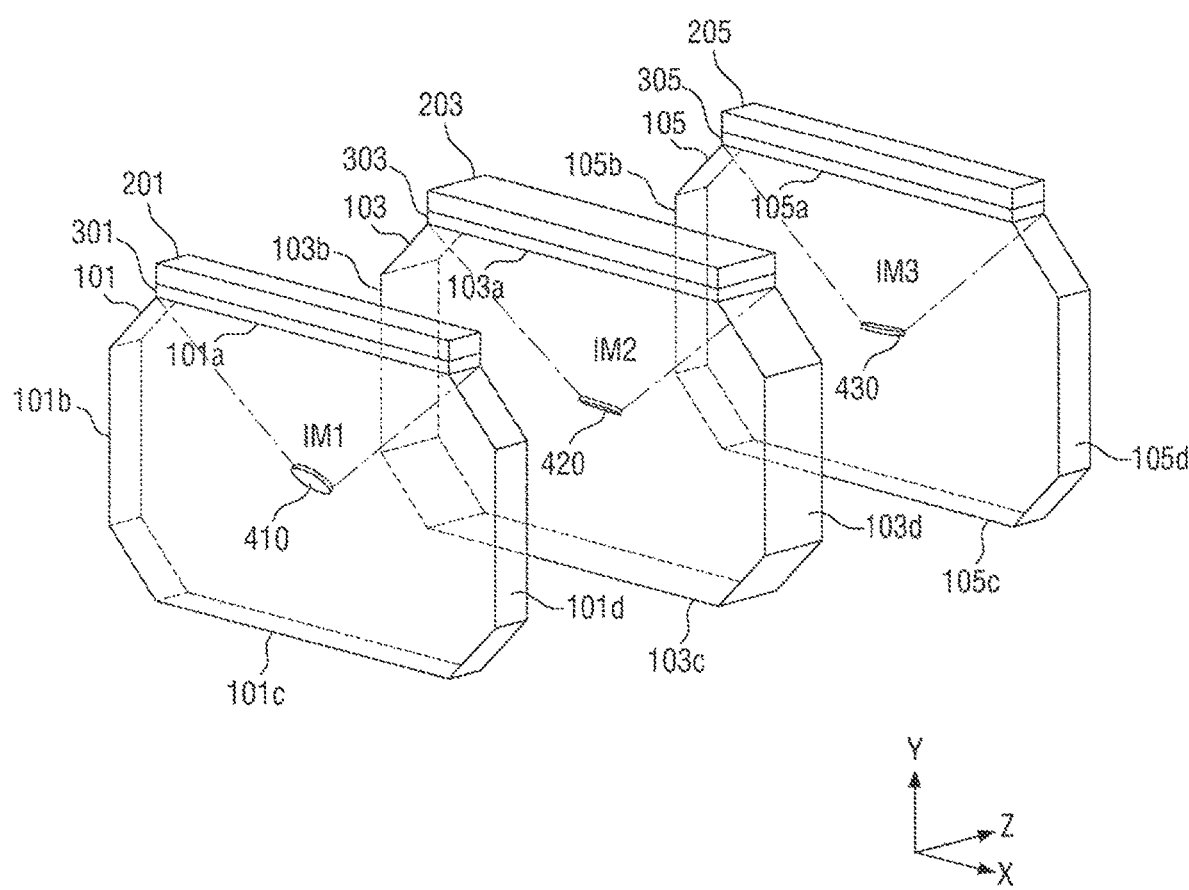
FIG. 7 is an exploded perspective view of a lens of the augmented reality according to another embodiment of the present disclosure.

FIG. 6 is a perspective view of an augmented reality providing apparatus according to another embodiment of the present disclosure, and FIG. 7 is an exploded perspective view of a lens of the augmented reality providing apparatus of FIG. 6.

The embodiment of FIGS. 6 and 7 differs from the embodiment of FIG. 1 in that a display device 200_1 includes first, second, and third display panels 201, 203, and 205. The embodiment of FIGS. 6 and 7 will hereinafter be described while focusing mainly on differences from the embodiment of FIG. 1.

Referring to FIGS. 6 and 7, an augmented reality providing apparatus 10_1 may include a lens 100, the display device 200_1, and an adhesive layer 300_1.

The lens 100 may include a plurality of lens portions. In one embodiment, the lens 100 may include first, second, and third lens portions 101, 103, and 105.

The lens 100 may include first, second, and third reflective members 410, 420, and 430. For example, the first reflective member 410 may be located in the first lens portion 101, the second reflective member 420 may be located in the second lens portion 103, and the third reflective member 430 may be located in the third lens portion 105. The first, second, and third reflective members 410, 420, and 430 may also be referred to as pin mirrors.

The display device 200_1 displays virtual images for realizing augmented reality. The display device 200_1 may include a plurality of display panels. The display device 200_1 may include first, second, and third display panels 201, 203, and 205 for respectively displaying first, second, and third images IM1, IM2, and IM3. That is, the display device 200_1 may include the first display panel 201 displaying the first image IM1, the second display panel 203 displaying the second image IM2, and the third display panel 205 displaying the third image IM3. The first, second, and third display panels 201, 203, and 205 may respectively correspond to the first, second, and third lens portions 101, 103, and 105. For example, the first display panel 201 may be located on one side of the first lens portion 101, the second display panel 203 may be located on one side of the second lens portion 103, and the third display panel 205 may be located on one side of the third lens portion 105. However, the present disclosure is not limited to this.

For example, the first, second, and third display panels 201, 203, and 205 may be located in parallel in the thickness direction of the lens 100 (i.e., a third direction/Z-axis direction). For example, the first, second, and third display panels 201, 203, and 205 may be located on a first side "a" of the lens 100, but the present disclosure is not limited thereto. For example, the first, second, and third display panels 201, 203, and 205 may be located on at least one of the first side "a" and second, third, and fourth sides b, c, and d of the lens 100. Also, the first, second, and third display panels 201, 203, and 205 may be located on different sides of the lens 100. For example, the first display panel 201 may be located on the first side a of the lens 100, the second display panel 203 may be located on the second side b of the lens 100, and the third display panel 205 may be located on the third side c of the lens 100. In another example, the first and second display panels 201 and 203 may be located on the first side a of the lens 100, and the third display panel 205 may be located on the third side c of the lens 100. The adhesive layer 300_1 adheres the lens 100 and the display device 200_1 together.

The adhesive layer 300_1 may include a plurality of adhesive portions. For example, the first adhesive layer 300_1 may include a first adhesive portion 301 adhering the first lens portion 101 and the first display panel 201 together, a second adhesive portion 303 adhering the second lens portion 103 and the second display panel 203 together, and a third adhesive portion 305 adhering the third lens portion 105 and the third display panel 205 together. However, the present disclosure is not limited thereto. For example, the adhesive layer 300_1 may include a single adhesive layer 300_1 adhering the first, second, and third lens portions 101, 103, and 105 and the first, second, and third display panels 201, 203, and 205 together at once. The adhesive layer 300_1 may be formed as an optically clear resin film or an optically clear adhesive film. The first, second, and third reflective members 410, 420, and 430 may have different angles.

The first, second, and third reflective members 410, 420, and 430 reflect and thereby provide virtual images displayed by the display device 200_1 to an eye E of the user. Because the virtual images displayed by the display device 200_1 are reflected by the first, second, and third reflective members 410, 420, and 430 having different angles, the depth of field of the virtual images deepens.

For example, referring to FIG. 6, the first reflective member 410 of the first lens portion 101 provides a first image IM1 displayed by the display device 200_1 to the eye E of the user by reflecting the first image IM1 toward a first surface SF1 of the lens 100. Further, the second reflective member 420 of the second lens portion 103 provides a second image IM2 displayed by the display device 200_1 to the eye E of the user by reflecting the second image IM2 toward the first surface SF1 of the lens 100, and the third reflective member 430 of the third lens portion 105 provides a third image IM3 displayed by the display device 200_1 to the eye E of the user by reflecting the third image IM3 toward the first surface SF1 of the lens 100.

The first, second, and third reflective members 410, 420, and 430 may allow the virtual images displayed by the display device 200_1 (e.g., the first, second, and third images IM1, IM2, and IM3) to be focused on a single point or area on the retina of the eye E of the user. As a result, even when the user focuses on a real image through the lens 100, the user can see the virtual images (e.g., the first, second, and third images IM1, IM2, and IM3) clearly. That is, the user can see the virtual images clearly without the need to shift his or her focus placed on the real image. The first, second, and third reflective members 410, 420, and 430, which are located in the first, second, and third lens portions 101, 103, and 105, respectively, may be inclined at different angles, and may overlap with one another in the third direction (or the Z-axis direction), but the present disclosure is not limited thereto.

Figure 8:
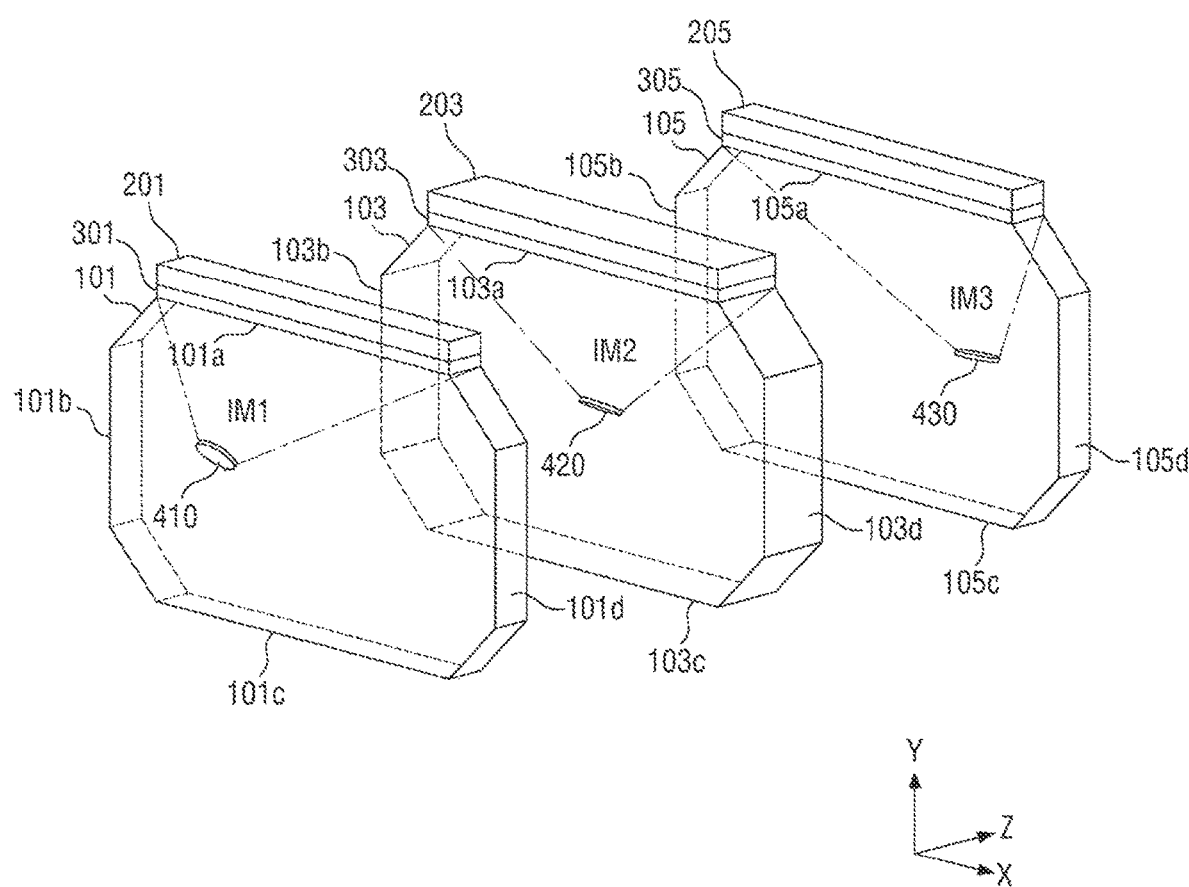
FIG. 8 is an exploded perspective view of a lens according to another embodiment of the present disclosure.

FIG. 8 is an exploded perspective view of an augmented reality providing apparatus according to another embodiment of the present disclosure. Referring to FIG. 8, a first reflective member 410 of a first lens portion 101 may be located relatively close to a second side 101b of the first lens portion 101, a second reflective member 420 of a second lens portion 103 may be located at the center of the second lens portion 103, and a third reflective member 430 of a third lens portion 105 may be located relatively close to a fourth side 105d of the third lens portion 105.

Figure 9:
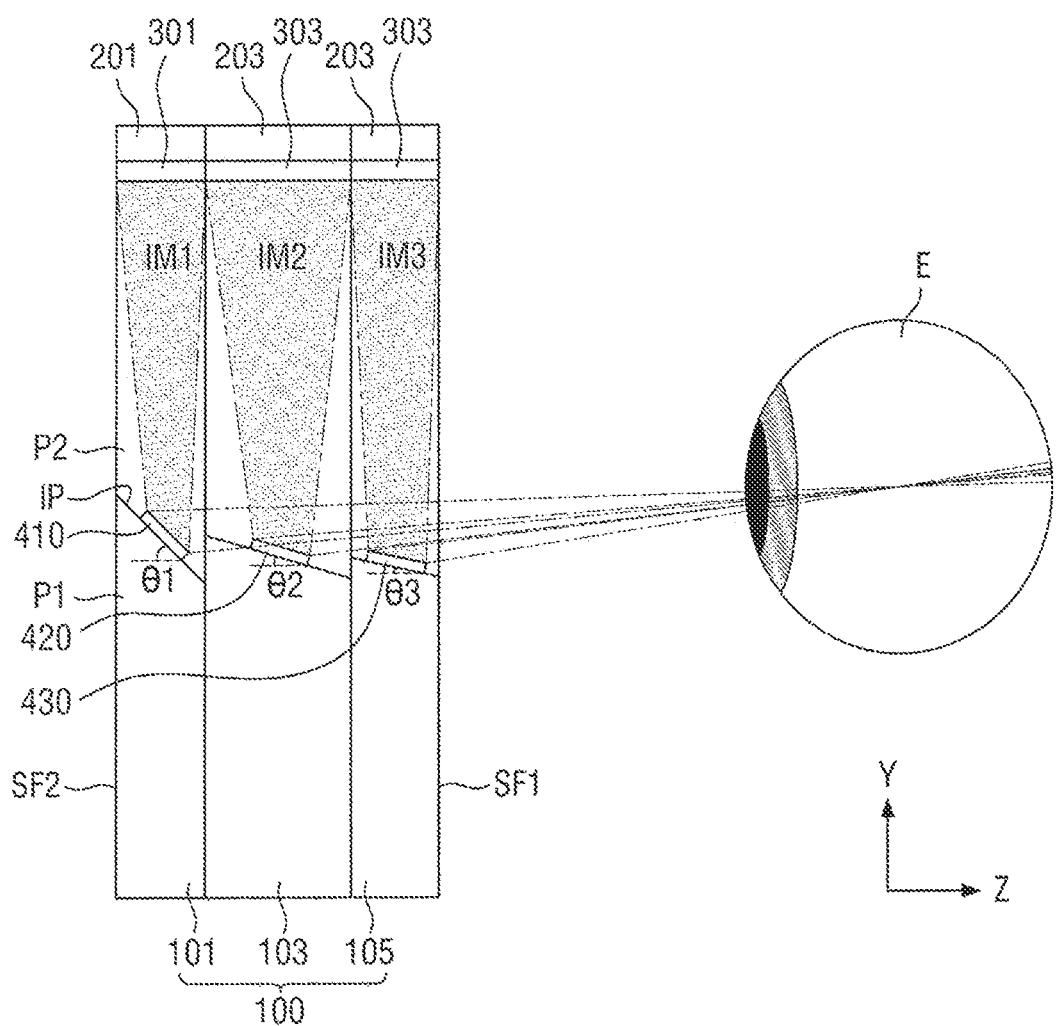
FIG. 9 is a schematic cross-sectional view of an augmented reality providing apparatus according to another embodiment of the present disclosure.

FIG. 9 is a schematic cross-sectional view of an augmented reality providing apparatus according to another embodiment of the present disclosure. Referring to FIG. 9, a first reflective member 410 may be located in a first lens portion 101, a second reflective member 420 may be located in a second lens portion 103, and a third reflective member 430 may be located in a third lens portion 105.

A first inclination angle θ1 of the first reflective member 410 may be set such that the first reflective member 410 is able to reflect and thereby provide a first image IM1 of a first display panel 201 to an eye E of a user. A second inclination angle θ2 of the second reflective member 420 may be set such that the second reflective member 420 is able to reflect and thereby provide a second image IM2 of a second display panel 203 to the eye E of the user. A third inclination angle θ3 of the third reflective member 430, which is different from the first and second inclination angles θ1 and θ2, may be set such that the third reflective member 430 is able to reflect and thereby provide a third image IM3 of a third display panel 205 to the eye E of the user. Because the first, second, and third reflective members 410, 420, and 430 are located at different inclination angles (i.e., the first, second, and third inclination angles 81, 82, and 83, respectively), even images that fall beyond the retina of the eye E of the user can be reflected toward the retina of the eye E of the user, and as a result, the field of view of the user can be widened.

Figure 10:
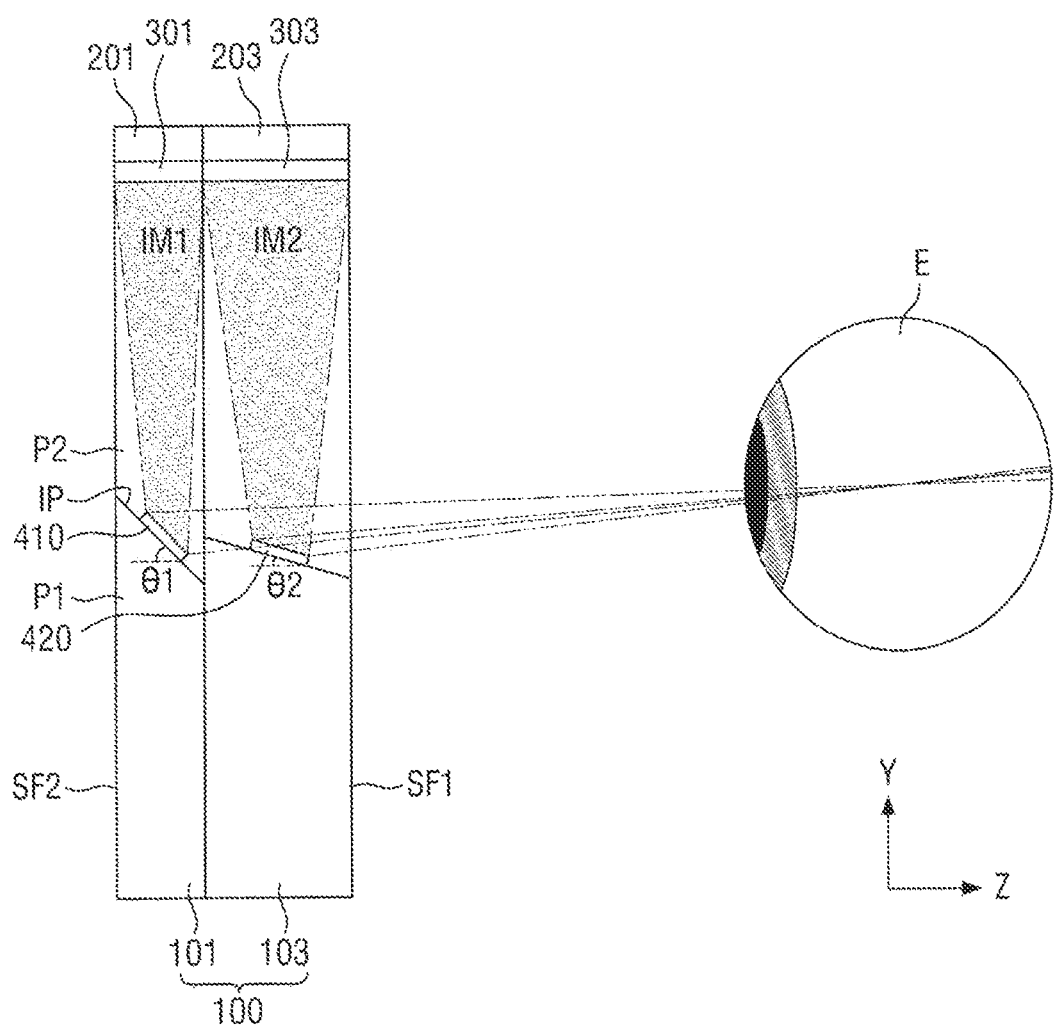
FIG. 10 is a schematic cross-sectional view of an augmented reality providing apparatus according to another embodiment of the present disclosure.

FIG. 10 is a schematic cross-sectional view of an augmented reality providing apparatus according to another embodiment of the present disclosure. Referring to FIG. 10, a display device 200 may include first and second display panels 201 and 203, and a lens 100 may include first and second lens portions 101 and 103.

A first inclination angle θ1 of a first reflective member 410 included in the first lens portion 101 may be set such that the first reflective member 410 is able to reflect and thereby provide a first image IM1 of the first display panel 201 to an eye E of a user. A second inclination angle θ2 of the second reflective member 420 may be set such that the second reflective member 420 is able to reflect and thereby provide a second image IM2 of the second display panel 203 to the eye E of the user.

Figure 11:
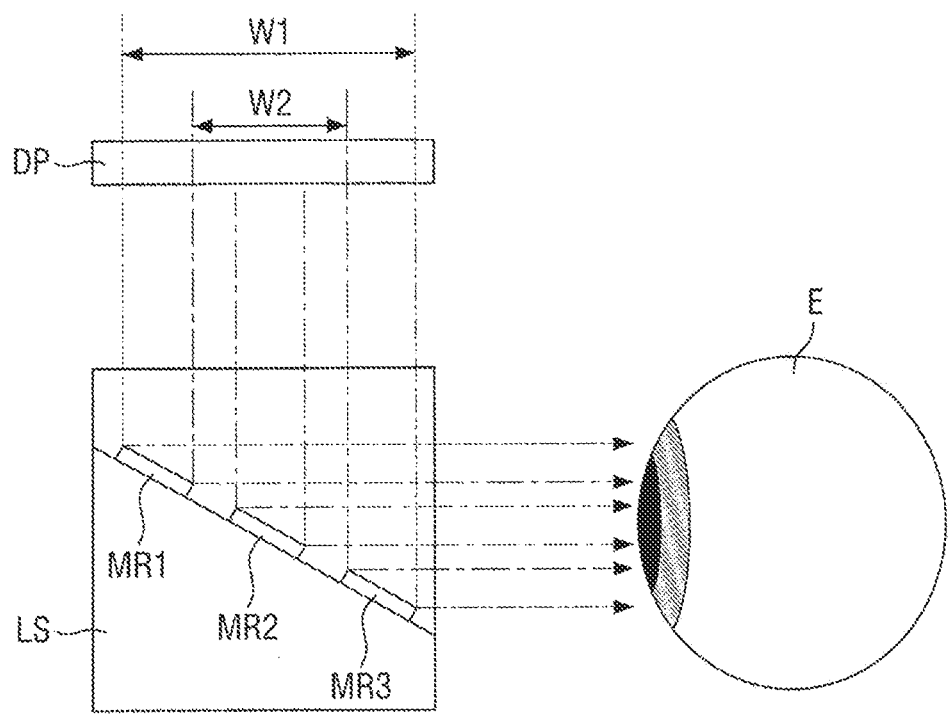
FIG. 11 is a schematic view illustrating the field of view (FOV) of a user when refractive members are located at the same inclination angle.
Figure 12:
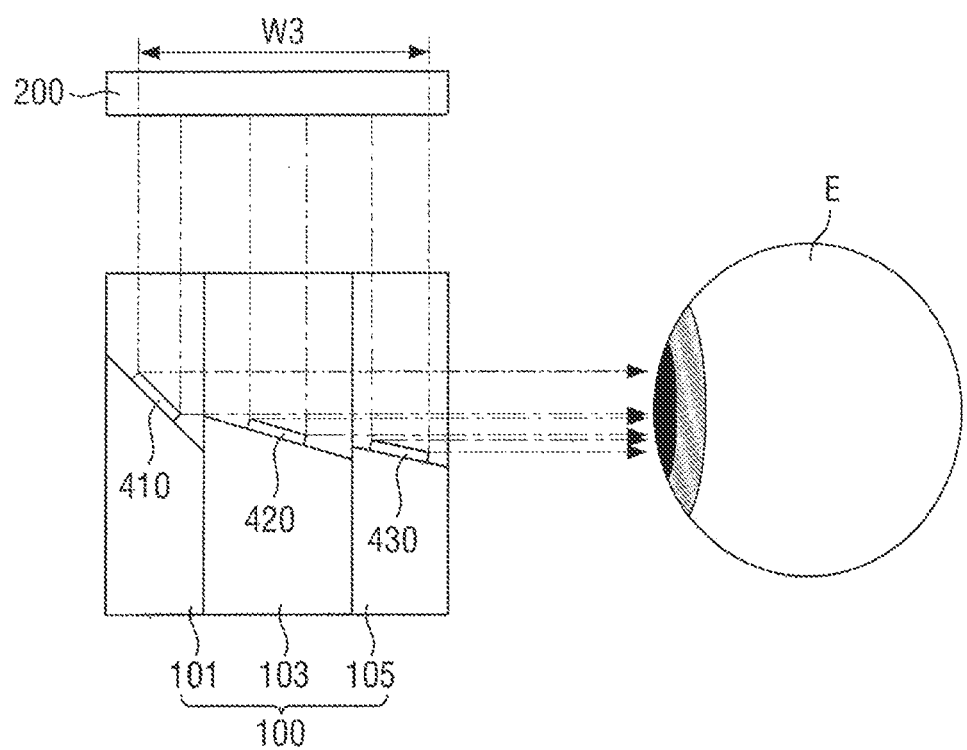
FIG. 12 is a schematic view illustrating the field of view of the user when a lens according to an embodiment of the present disclosure is employed.

FIG. 11 is a schematic view illustrating the field of view of a user when reflective members are located at the same angles, and FIG. 12 is a schematic view illustrating the field of view of a user when a lens according to an embodiment of the present disclosure is employed.

Referring to FIG. 11, an image output by a display device DP is reflected by first, second, and third reflective members MR1, MR2, and MR3, and is thus provided to the retina of an eye E of a user. When the display area of the display device DP is set as W1, images displayed on the outer sides of W1 are reflected by the first and third reflective members MR1 and MR3, but fail to fall on the retina of the eye E of the user by falling beyond, or outside of, the pupil of the eye E of the user. That is, only images displayed in less than an entire region of the display device DP (e.g., region W2) can be incident upon the pupil of the eye E of the user to be seen by the user.

Referring to FIG. 12, images output by a display device 200 are reflected by first, second, and third reflective members 410, 420, and 430, which are located in first, second, and third lens portions 101, 103, and 105, respectively, and are thus provided to the retina of an eye E of a user. A lens 100 consists of multiple lens portions (i.e., the first, second, and third lens portions 101, 103, and 105), and the inclination angles of the first, second, and third reflective members 410, 420, and 430 can be set to differ from one lens portion to another lens portion. Accordingly, images output in the display area of the display device 200 can be reflected at various angles. That is, when the display area of the display device 200 is set as W3, the inclination angles of the first and third reflective members 410 and 430 may be set such that images displayed on the outer sides of W3 can be incident upon the pupil of the eye of the user. For example, even images that would otherwise fall beyond the pupil of the eye E of the user can be made to be incident upon the pupil of the eye E of the user by setting the inclination angle of the first reflective member 410 to be greater than the inclination angle of the second reflective member 420, and by setting the inclination angle of the third reflective member 430 to be smaller than the inclination angle of the second reflective member 420. Accordingly, all images displayed in W3, which is the display area of the display device 200, can be incident upon the pupil of the eye E of the user, and as a result, the field of view of the user can be widened.

Figure 13:
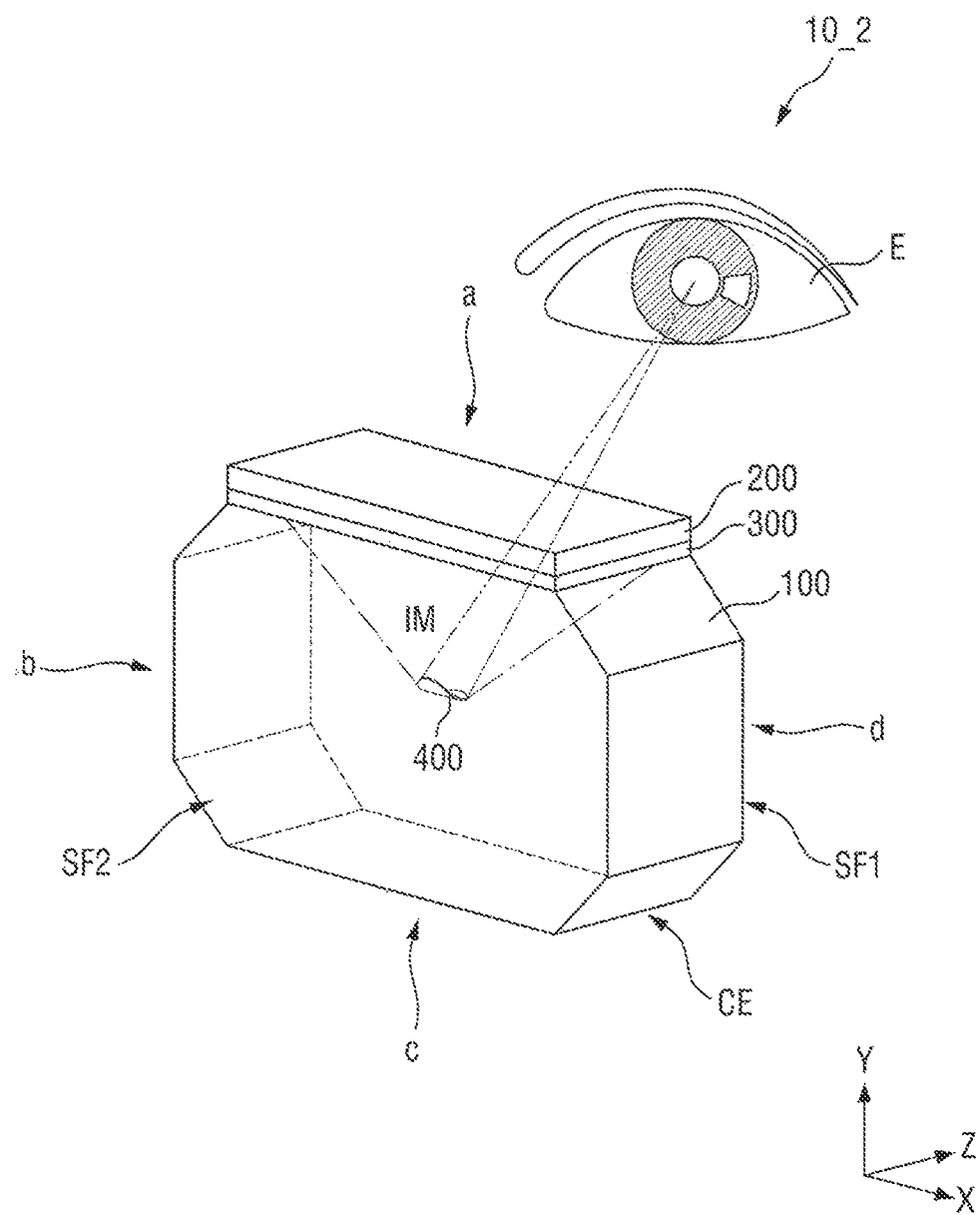
FIG. 13 is a perspective view of an augmented reality providing apparatus according to another embodiment of the present disclosure.
Figure 14:
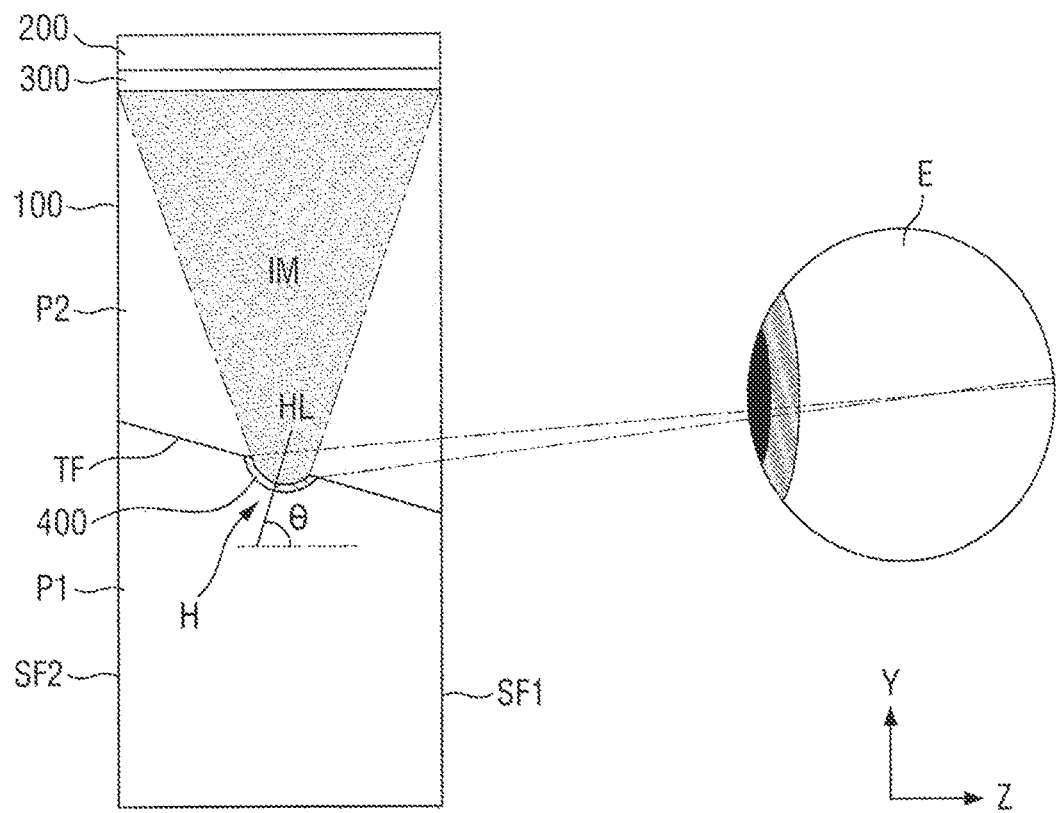
FIG. 14 is a cross-sectional view of the augmented reality providing apparatus of FIG. 13.

FIG. 13 is a perspective view of an augmented reality providing apparatus according to another embodiment of the present disclosure, and FIG. 14 is a cross-sectional view of the augmented reality providing apparatus of FIG. 13. The embodiment of FIGS. 13 and 14 differs from the embodiment of FIG. 1 in that a reflective member 400 is located along the morphology of a groove H of a lens 100. The embodiment of FIGS. 13 and 14 will hereinafter be described, focusing mainly on differences with the embodiment of FIG. 1.

Referring to FIGS. 13 and 14, an augmented reality providing apparatus 10_2 includes a lens 100, a display device 200, and an adhesive layer 300.

The lens 100 may be formed of glass or a polymer to be transparent or semitransparent. Accordingly, a user can see a real image through the lens 100.

The lens 100 may include first and second parts P1 and P2. The first and second parts P1 and P2 of the lens 100 may be bonded together to collectively form a single lens 100. A part of the lens 100 below the bonding surface of the lens 100 is defined as the first part P1, and a part of the lens 100 above the bonding surface of the lens 100 is defined as the second part P2.

The groove H, which is in the form of a recess, is located on a top surface TF of the first part P1. The top surface TF of the first part P1 may have a slope (e.g., a predetermined slope), and the groove H on the top surface TF may be inclined toward a first surface SF1 that faces an eye E of the user and may have an inclination angle θ. The inclination angle θ refers to the angle at which a line HL that is normal to a central point of the groove H is inclined from a third direction (or a Z-axis direction) toward a second direction (or a Y-axis direction).

The groove H may have a semicircular cross-sectional shape, but the present disclosure is not limited thereto. For example, the groove H may have various other cross-sectional shapes, such as a triangular or elliptical cross-sectional shape. The groove H may have a diameter of about 400 μm to about 2 mm, but the present disclosure is not limited thereto. The reflective member 400, which has a concave shape, may be located in the groove H along the morphology of the groove H.

The reflective member 400 may be smaller in size than the pupil of the eye E of the user, may have a diameter of about 100 μm to about 5 mm, and/or may be formed of one of silver (Ag), aluminum (Al), and rhodium (Rh). However, the present disclosure is not limited to this. The reflective member 400 may have a surface roughness of about 50 nm or less, but the present disclosure is not limited thereto. The second part P2 of the lens 100 may be located on the first part P1 of the lens 100 and on the reflective member 400, and the bottom surface of the second part P2 may be in contact with the top surface TF of the first part P1 and with the reflective member 400 to fill the gap inside the reflective member 400.

Because the reflective member 400 is located along the morphology of the groove H, the reflective member 400 is also inclined at the same angle as the groove H (i.e., at the inclination angle θ) with respect to the first surface SF1 that faces the eye E of the user, and can thus reflect and thereby provide an image IM output by the display device 200 to the eye E of the user. The reflective member 400 has a concave shape, and may be suitable for focusing the image IM on the pupil of the eye E of the user.

Figure 15:
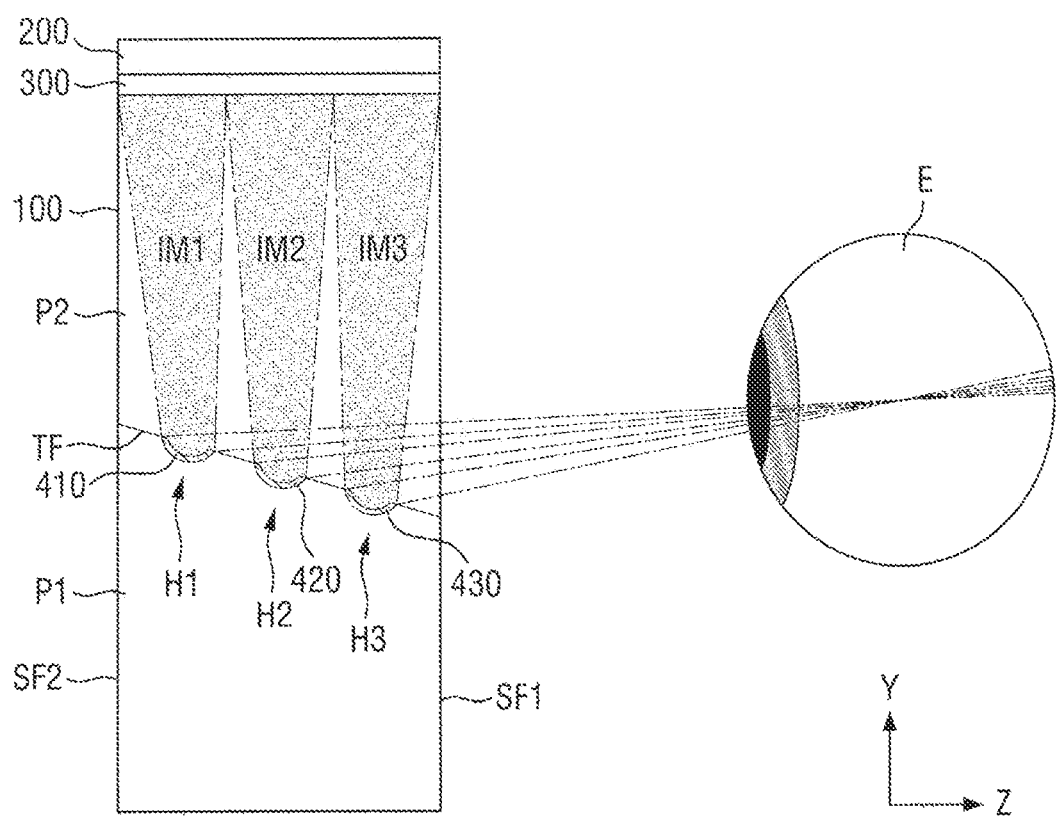
FIG. 15 is a cross-sectional view of an augmented reality providing apparatus according to another embodiment of the present disclosure.

FIG. 15 is a cross-sectional view of an augmented reality providing apparatus according to another embodiment of the present disclosure. Referring to FIG. 15, in one embodiment, a plurality of grooves H, which have a concave shape, may be located on a top surface TF of a first part P1. For example, first, second, and third grooves H1, H2, and H3 may be located on the top surface TF of the first part P1. First, second, and third reflective members 410, 420, and 430 may be located in the first, second, and third grooves H1, H2, and H3, respectively. That is, the first reflective member 410, which has a concave shape, may be located in the first groove H1 along the morphology of the first groove H1, the second reflective member 420, which has a concave shape, may be located in the second groove H2 along the morphology of the second groove H2, and the third reflective member 430, which has a concave shape, may be located in the third groove H3 along the morphology of the third groove H3. In one embodiment, the first, second, and third grooves H1, H2, and H3 may have the same diameter, and the first, second, and third reflective members 410, 420, and 430 may have the same diameter.

The first, second, and third reflective members 410, 420, and 430 may be spaced apart from one another in the thickness direction of the lens 100 (i.e., a third direction/Z-axis direction), and the first, second, and third reflective members 410, 420, and 430 may have, or may be located at, different heights.

That is, the first, second, and third reflective members 410, 420, and 430 may be at different locations in the height direction of the lens 100 (i.e., a second direction/Y-axis direction). For example, the height of, or vertical location of, the first, second, and third reflective members 410, 420, and 430 may sequentially increase or decrease from the first reflective member 410 to the second reflective member 420 to the third reflective member 430, but the present disclosure is not limited thereto. The first reflective member 410 may be set to reflect and thereby provide a first image IM1 of a display device 200 to an eye E of a user. The second reflective member 420 may be set to reflect and thereby provide a second image IM2 of the display device 200 to the eye E of the user. The third reflective member 430 may be set to reflect and thereby provide a third image IM3 of the display device 200 to the eye E of the user. The first, second, and third reflective members 410, 420, and 430, which have a concave shape, reflect and thereby provide virtual images displayed by the display device 200 to the eye E of the user. Because the virtual images displayed by the display device 200 are reflected by the first, second, and third reflective members 410, 420, and 430, the depth of field of the virtual images deepens.

Figure 16:
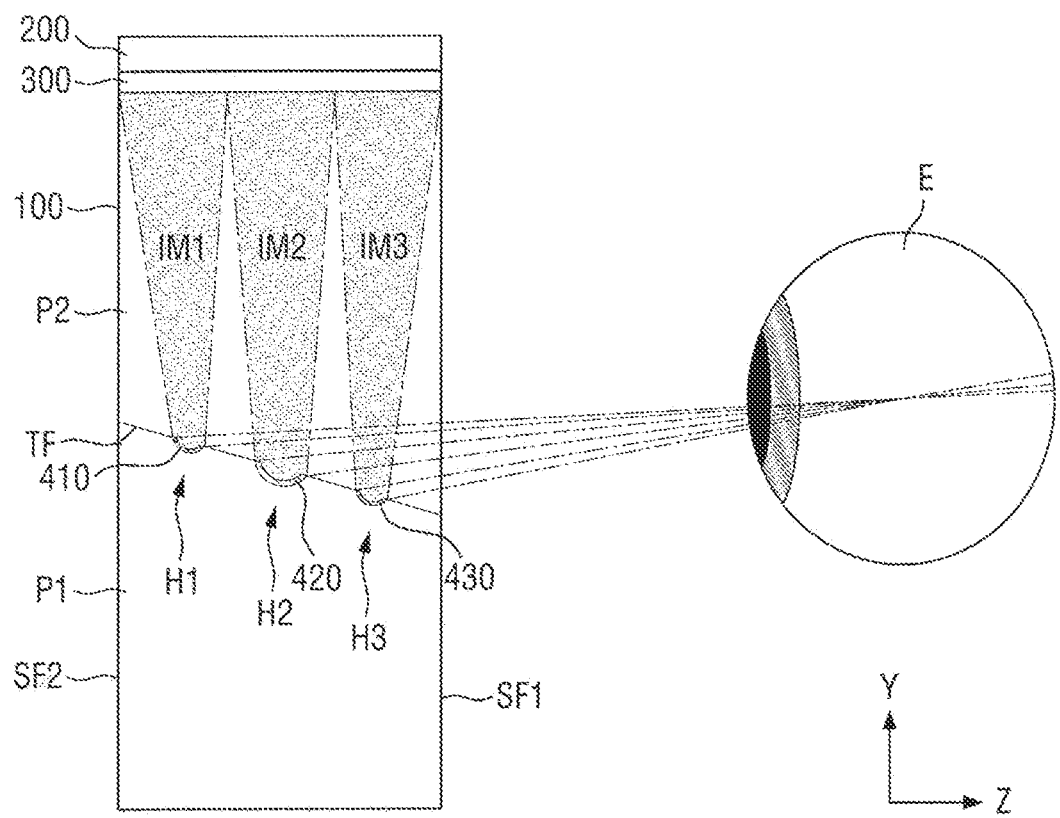
FIG. 16 is a cross-sectional view of an augmented reality providing apparatus according to another embodiment of the present disclosure.

FIG. 16 is a cross-sectional view of an augmented reality providing apparatus according to another embodiment of the present disclosure. Referring to FIG. 16, in one embodiment, multiple grooves H having different diameters (e.g. different radii of curvature) may be located on a top surface TF of a first part P1. For example, the diameter or radius of curvature of a second groove H2 may be greater than the diameter or radius of curvature of a first groove H1, and a third groove H3. However, the present disclosure is not limited to this. That is, in another example, the diameter or radius of curvature of the first, second, and third grooves H1, H2, and H3 may sequentially increase or decrease from the first groove H1 to the second groove H2 to the third groove H3.

In yet another example, two of the first, second, and third grooves H1, H2, and H3 may have the same diameter, and the other groove may have a different diameter from the two grooves. First, second, and third reflective members 410, 420, and 430 having different diameters may be located in the first, second, and third grooves H1, H2, and H3, respectively. For example, the diameter of the first reflective member 410 may be greater than the diameter of the second reflective member 420, and the diameter of the third reflective member 430 may be smaller than the diameter of the second reflective member 420. However, the present disclosure is not limited to this. In another example, the diameter of the first, second, and third reflective members 410, 420, and 430 may sequentially increase or decrease from the first reflective member 410 to the second reflective member 420 to the third reflective member 430. In yet another example, two of the first, second, and third reflective members 410, 420, and 430 may have the same diameter, and the other reflective member may have a different diameter from the two reflective members.

Figure 17:
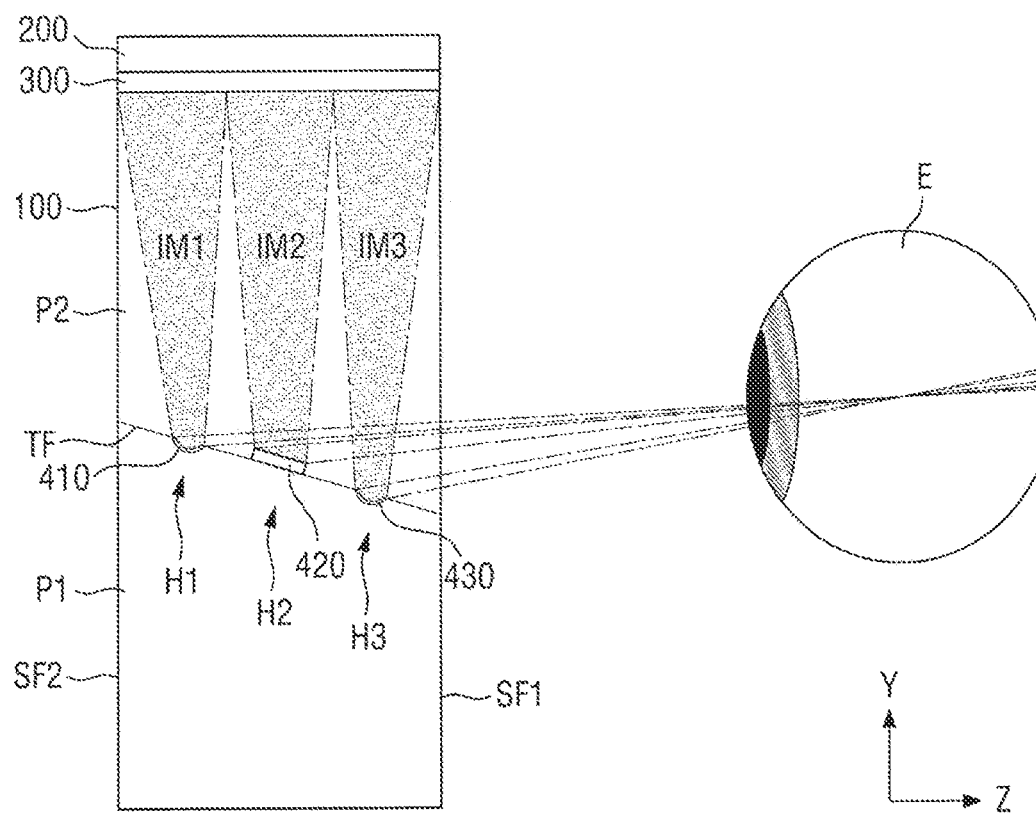
FIG. 17 is a cross-sectional view of an augmented reality providing apparatus according to another embodiment of the present disclosure.

FIG. 17 is a cross-sectional view of an augmented reality providing apparatus according to another embodiment of the present disclosure. Referring to FIG. 17, in one embodiment, different types of reflective members may be located in a lens 100. For example, first and second grooves H1 and H2 may be located on a top surface TF of a first part P1 to be spaced apart from each other. A first reflective member 410, which has a concave shape, may be located in a first groove H1 along the morphology of the first groove H1, a third reflective member 430, which has a concave shape, may be located in a third groove H3 along the morphology of the third groove H3, and a second reflective member 420, which has a flat shape, may be located on a part of the top surface TF between the first and third reflective members 410 and 430. However, the present disclosure is not limited thereto. Some of the reflective members of the lens 100 may have a concave shape, and some of the reflective members of the lens 100 may have a flat shape. Alternatively, some of the reflective members of the lens 100 may have a concave shape, and some of the reflective members of the lens 100 may have a convex shape. Still alternatively, some of the reflective members of the lens 100 may have a concave shape, some of the reflective members of the lens 100 may have a convex shape, and some of the reflective members of the lens 100 may have a flat shape.

Figure 18:
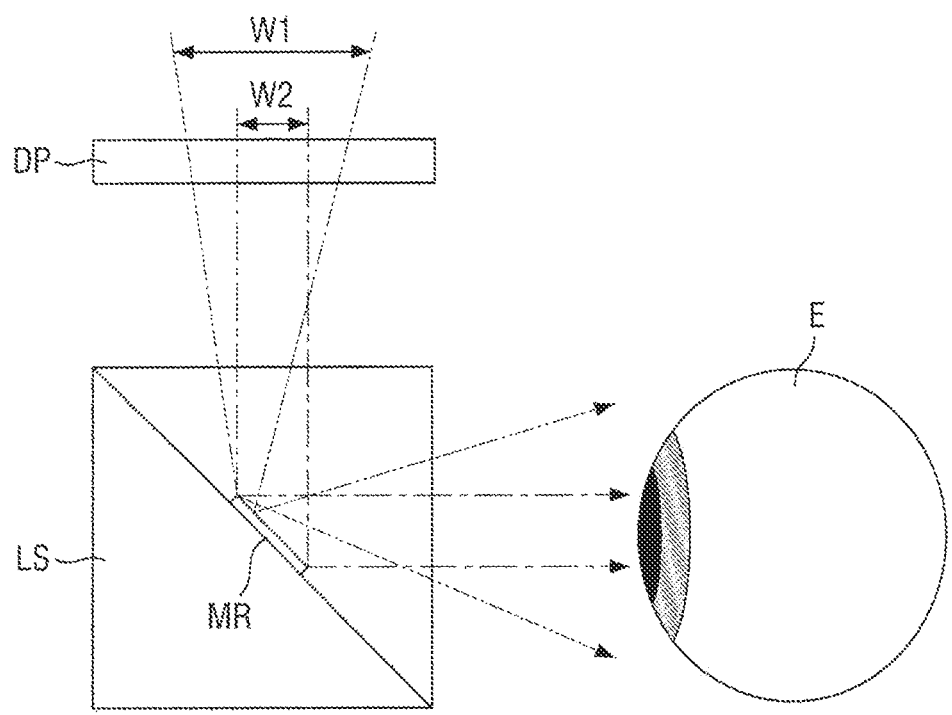
FIG. 18 is a schematic view illustrating the field of view of a user when a flat reflective member is used.
Figure 19:
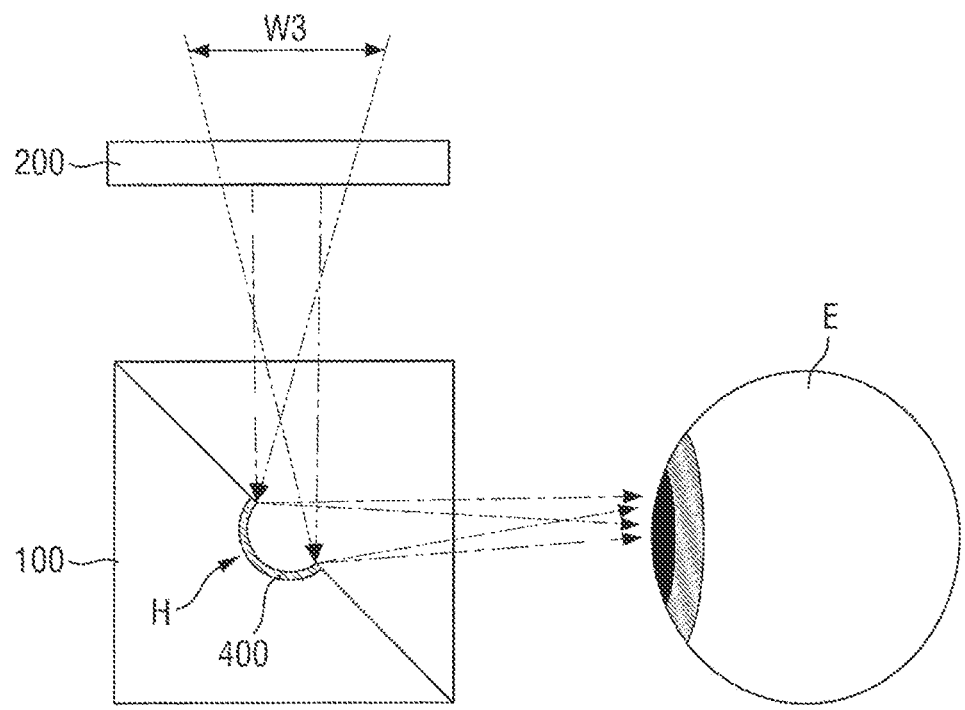
FIG. 19 is a schematic view illustrating the field of view of a user when a reflective member having a concave shape is used according to an embodiment of the present disclosure.

FIG. 18 is a schematic view illustrating the field of view of a user when a flat reflective member is used, and FIG. 19 is a schematic view illustrating the field of view of a user when a reflective member having a concave shape is used according to an embodiment of the present disclosure. Referring to FIG. 18, images output by a display device DP are reflected by a flat reflective member MR of a lens LS and are thus provided to the retina of an eye E of a user. When the display area of the display device DP is set as W1, images incident upon the flat reflective member MR at an angle (e.g., a predetermined angle) from the outer sides of W1 fail to fall on the retina of the eye E of the user by falling beyond/outside of the pupil of the eye E of the user. For example, only images displayed in W2 can be incident upon the pupil of the eye E of the user and can thus be seen by the user, W2 being smaller than W1.

Referring to FIG. 19, images output by a display device 200 are reflected by a reflective member 400, which is located in a groove H along the morphology of the groove H, and which has a concave shape, and are thus provided to the retina of an eye E of a user. When the display area of the display device 200 is set as W3, images incident upon the reflective member 400 at an angle (e.g., a predetermined angle) from the outer sides of W3 can be focused on the pupil of the eye E of the user by the reflective member 400, which has a concave shape facing the eye E of the user. Accordingly, all images displayed in W3, which is the display area of the display device 200, can be incident upon the pupil of the eye E of the user, and as a result, the field of view of the user can be widened.

Figure 20:
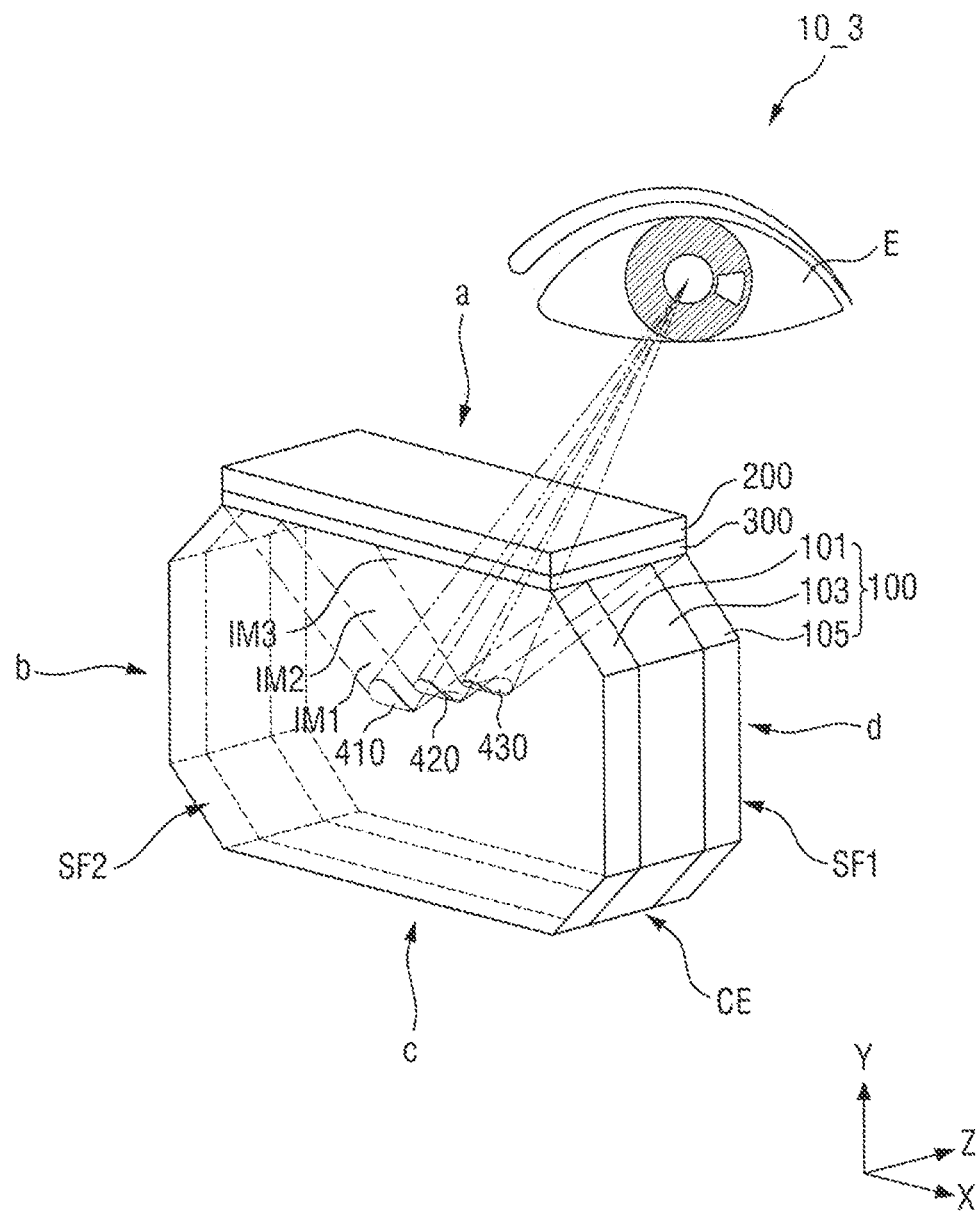
FIG. 20 is a perspective view of an augmented reality providing apparatus according to another embodiment of the present disclosure.
Figure 21:
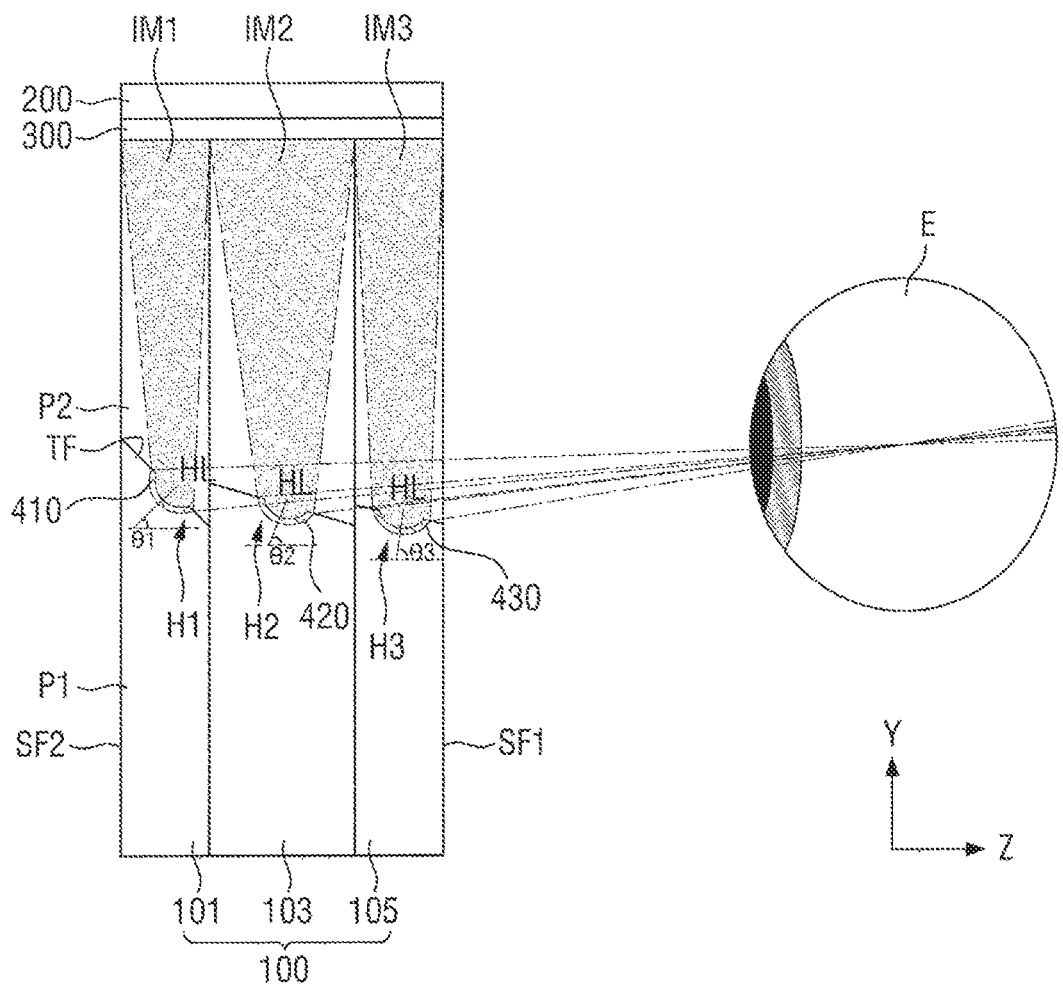
FIG. 21 is a cross-sectional view of the augmented reality providing apparatus of FIG. 20.

FIG. 20 is a perspective view of an augmented reality providing apparatus according to another embodiment of the present disclosure, and FIG. 21 is a cross-sectional view of the augmented reality providing apparatus of FIG. 20. The embodiment of FIGS. 20 and 21 differs from the embodiment of FIG. 1 in that a lens 100 includes grooves H, and that reflective members 400 are located along the morphology of the grooves H of the lens 100. The embodiment of FIGS. 20 and 21 will hereinafter be described, focusing mainly on differences with the embodiment of FIG. 1.

Referring to FIGS. 20 and 21, an augmented reality providing apparatus 10_3 may include a lens 100, a display device 200, and an adhesive layer 300.

The lens 100 may include a plurality of lens portions. In one embodiment, the lens 100 may include first, second, and third lens portions 101, 103, and 105, but the present disclosure is not limited thereto. For example, the lens 100 may include at least two lens portions. Each of the first, second, and third lens portions 101, 103, and 105 may include first and second parts P1 and P2. The first and second parts P1 and P2 of the lens 100 may be bonded together to form each of the first, second, and third lens portions 101, 103, and 105.

First, second, and third grooves H1, H2, and H3, which have a concave shape, may be located on a top surface TF of the first part P1. The first groove H1 may be located on the top surface TF of the first part P1 of the first lens portion 101, the second groove H2 may be located on the top surface TF of the first part P1 of the second lens portion 103, and the third groove H3 may be located on the top surface TF of the first part P1 of the third lens portion 105.

The first parts P1 of the first, second, and third lens portion 101, 103, and 105 may have different slopes, and the first, second, and third grooves H1, H2, and H3 may be inclined toward a first surface SF1 that faces an eye E of a user and may have first, second, and third inclination angles θ1, θ2, and θ3, respectively. For example, the first groove H1 of the first lens portion 101 may have the first inclination angle θ1, the second groove H2 of the second lens portion 103 may have the second inclination angle θ2, which is greater than the first angle θ1, and the third groove H3 of the third lens portion 105 may have the third inclination angle θ3, which is greater than the second angle θ2. The first, second, and third inclination angles θ1, θ2, and θ3 refer to the angles at which lines HL that are normal to the central points of the first, second, and third grooves H1, H2, and H3 are inclined from a third direction (or a Z-axis direction) toward a second direction (or a Y-axis direction).

First, second, and third reflective members 410, 420, and 430, which have a concave shape, may be located on top of the first, second, and third grooves H1, H2, and H3, respectively, along the morphology of the first, second, and third grooves H1, H2, and H3, respectively. For example, the first reflective member 410, which has a concave shape, may be inclined toward the first surface SF1 at the same inclination angle as the first groove H1 (i.e., the first inclination angle θ1), the second reflective member 420, which has a concave shape, may be inclined toward the first surface SF1 at the same inclination angle as the second groove H2 (i.e., the second inclination angle θ2), and the third reflective member 430, which has a concave shape, may be inclined toward the first surface SF1 at the same inclination angle as the third groove H3 (i.e., the third inclination angle θ3).

The first, second, and third reflective members 410, 420, and 430 are located to have different angles. The first, second, and third reflective members 410, 420, and 430 reflect, and thereby provide, virtual images displayed by the display device 200 to the eye E of the user. Because the virtual images displayed by the display device 200 are reflected by the first, second, and third reflective members 410, 420, and 430 having different angles, the depth of field of the virtual images deepens.

For example, the first reflective member 410 of the first lens portion 101 provides a first image IM1 displayed by the display device 200 to the eye E of the user by reflecting the first image IM1 toward the first surface SF1 of the lens 100. Also, the second reflective member 420 of the second lens portion 103 provides a second image IM2 displayed by the display device 200 to the eye E of the user by reflecting the second image IM2 toward the first surface SF1 of the lens 100, and the third reflective member 430 of the third lens portion 105 provides a third image IM3 displayed by the display device 200 to the eye E of the user by reflecting the third image IM3 toward the first surface SF1 of the lens 100. The first, second, and third reflective members 410, 420, and 430, which have a concave shape, may allow the virtual images displayed by the display device 200, e.g., the first, second, and third images IM1, IM2, and IM3, to be focused on a single point on the retina of the eye E of the user. As a result, the field of view of the user can be widened. Also, even when the user focuses on a real image through the lens 100, the user can see the virtual images clearly.

FIGS. 22 through 26 are cross-sectional views illustrating a method of fabricating a lens of an augmented reality providing apparatus, the lens having a concave reflective member formed therein, according to an embodiment of the present disclosure.

Figure 22:
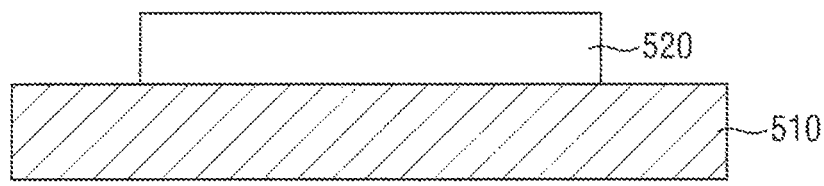
FIGS. 22 through 26 are cross-sectional views illustrating a method of fabricating a lens of an augmented reality providing apparatus, having a concave reflective member formed therein, according to an embodiment of the present disclosure.

Referring to FIG. 22, a raw lens 520 is placed on a work table 510. The raw lens 520 is illustrated as having a flat top surface, but the present disclosure is not limited thereto. For example, the top surface of the raw lens 520 may have a slope (e.g., a predetermined slope). For example, the raw lens 520 may be the first part P1 of the lens 100 of FIG. 14. The raw lens 520 may be formed of glass, a polymer, or alkali-free glass.

Figure 23:
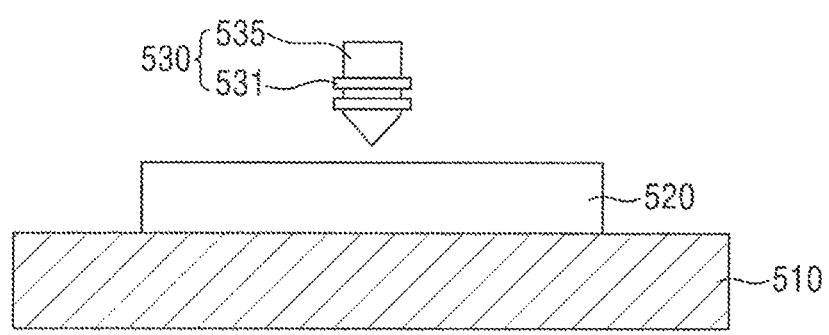

Referring to FIG. 23, an induction heating element 530 is placed over a region in which to form a groove H. The induction heating element 530 may include a hollow heating tube 535 and an external induction coil 531 wound on the outer circumferential surface of the hollow heating tube 535. Multiple grooves H can be formed by moving a single induction heating element 530 from one place to another or by using multiple induction heating elements 530.

Figure 24:
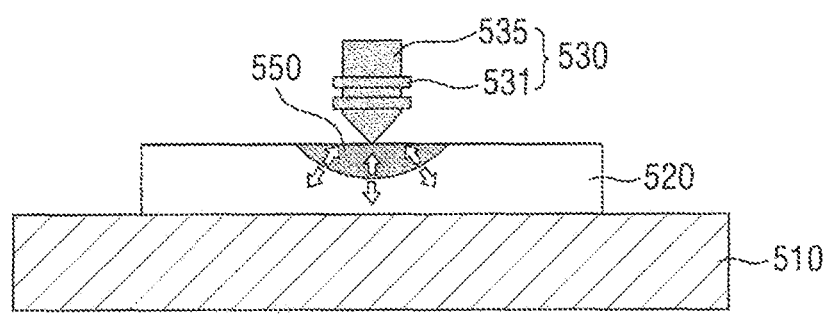

Referring to FIG. 24, the induction heating element 530 is heated and is placed in contact with the top surface of the raw lens 520 where the groove H is to be formed. That is, a part of the heating tube 535 with the external induction coil 531 wound thereon is heated using the external induction coil 531. The heating tube 535 may be heated to a temperature of about 700° C. to about 1200° C., but the present disclosure is not limited thereto. The heated heating tube 535 is placed in contact with the region of the raw lens 520 in which to form the groove H. The heated heating tube 535 may be placed in contact with the region of the raw lens 520 in which to form the groove H, for about 0.1 seconds to about 1 second.

Equation 1 is provided below $$\sigma_f = \frac{E \cdot \alpha \cdot \Delta T}{(1-v)} \qquad \text{Equation 1}$$

where σf is Tensile Strain, α is Thermal Expansion Coefficient, ΔT is Temperature Gradient, y is Poisson's Ratio, and E is Young's Modulus.

Referring to Equation 1 above, tensile strain σf is proportional to a thermal expansion coefficient α, and the greater the tensile strain σf is, the more easily a peeling phenomenon occurs. In one embodiment, when the raw lens 520 is formed of glass, the thermal expansion coefficient α may be about 70 to about 80 (10-7/° C.), and the region of the raw lens 520 in which to form the groove H may be heated to a temperature of about 1200° C. to about 1300° C. In another embodiment, when the raw lens 520 is formed of a polymer, the thermal expansion coefficient α may be about 150 (10-7/° C.) or greater, and the region of the raw lens 520 in which to form the groove H may be heated to a temperature of about 800° C. to about 1000° C. In yet another embodiment, when the raw lens 520 is formed of alkali-free glass, the thermal expansion coefficient α may be about 30 to about 40 (10-7/° C.), and the region of the raw lens 520 in which to form the groove H may be heated to a temperature of about 1400° C. to about 1500° C. However, the present disclosure is not limited to these embodiments. The temperature to which the region of the raw lens 520 in which to form the groove H is heated may vary depending on the diameter of the groove H, the material of the raw lens 520, and the temperature of the heating tube 535.

A part of the top surface of the raw lens 520 corresponding to the groove H and placed in contact with the heated heating tube 535 is heated, and then, the raw lens 520 is quickly cooled. The raw lens 520 may be quickly cooled to a temperature of about −200° C. to about 0° C., but the present disclosure is not limited thereto. The heating and the cooling of the raw lens 520 are performed within a relatively short period of time. For example, the heating and the cooling of the raw lens 520 may be performed within about 2 seconds, but the present disclosure is not limited thereto.

As the raw lens 520 is heated and quickly cooled, thermal shock is generated on the surface and the inside of the raw lens 520 due to a rapid change in temperature. Thus, the top of the raw lens 520 is contracted, and the bottom of the raw lens 520 is expanded. As a result, an upper portion of the raw lens 520 that is in contact with the heated heating tube 535 is peeled off from a lower portion of the raw lens 520 to correspond to the shape of the groove H.

Figure 25:
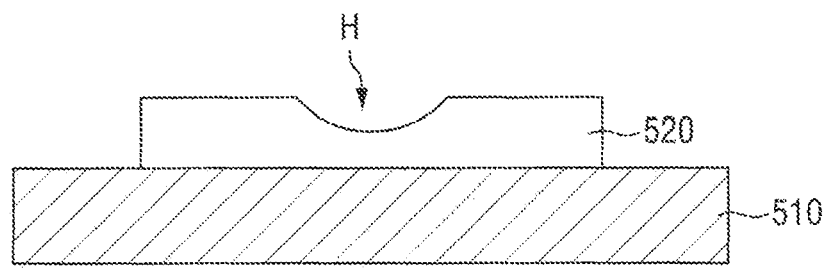

Referring to FIG. 25, by removing the upper portion of the raw lens 520 that is peeled off, a groove H having a semicircular cross-sectional shape is formed. In one embodiment, the groove H may have a semicircular cross-sectional shape, but the present disclosure is not limited thereto. For example, the groove H may have various other cross-sectional shapes, such as a triangular or elliptical cross-sectional shape. The groove H may have a diameter of about 400 μm to about 2 mm and may have a surface roughness of about 20 nm to about 40 nm, but the present disclosure is not limited thereto.

Figure 26:
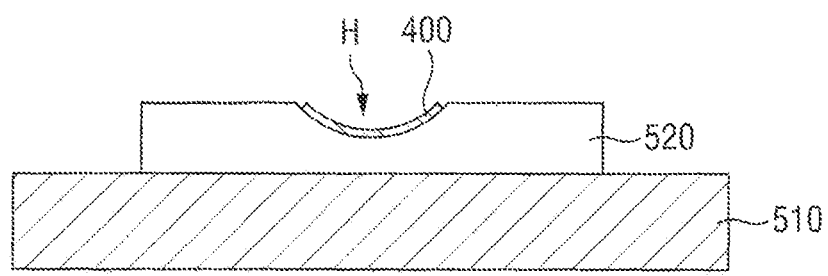

Referring to FIG. 26, a reflective member 400, which has a concave shape, may be formed on top of the groove H along the morphology of the groove H. The reflective member 400 may be formed to be smaller in size than the pupil of the human eye, and may have a diameter of about 100 μm to about 5 mm. The reflective member 400 may be formed by depositing at least one of silver (Ag), aluminum (Al), and rhodium (Rh), but the present disclosure is not limited thereto. For example, the reflective member 400 may be formed using various other methods such as a metal inorganic synthesis method, an electrochemical method, or a metal thin film lamination method. The reflective member 400 may have a surface roughness of about 50 nm or less, but the present disclosure is not limited thereto.

Figure 27:
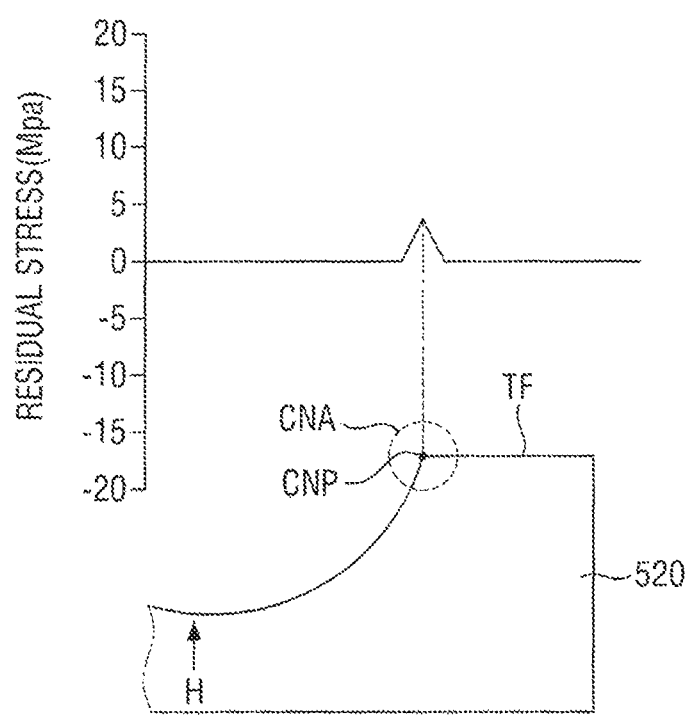
FIG. 27 is a graph showing the residual stress in the groove of a lens according to an embodiment of the present disclosure.

FIG. 27 is a graph showing the residual stress in the groove of a lens according to an embodiment of the present disclosure.

Referring to FIG. 27, due to thermal shock being caused by heating and then quickly cooking a lens 520, a groove H of the lens 520 has relatively high residual stress in an inflection region CNA where the groove H and a top surface TF of the lens 520 adjoin each other. For example, the groove H of the lens 520 may have a residual stress of about 4 MPa to about 6 MPa at an inflection point CNP where the groove H and the top surface TF of the lens 520 meet. The residual stress in the inflection region CNA may be inversely proportional to the distance from the inflection point CNP, and may be measured as 0 at a distance (e.g., a predetermined distance) or more away from the inflection point CNP (i.e., in a region outside the inflection region CNA).

Figure 28:
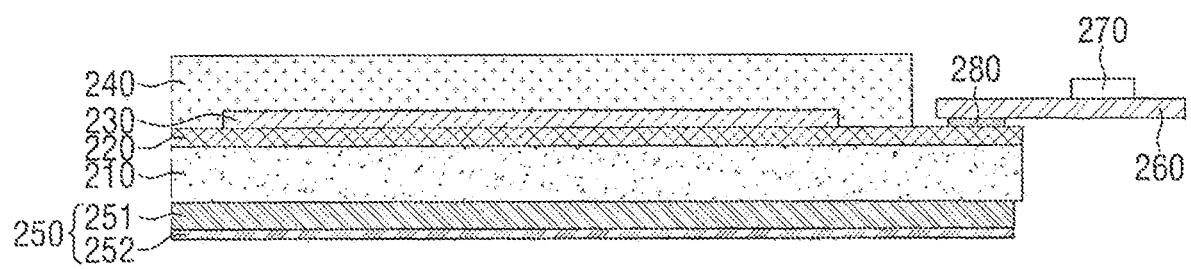
FIG. 28 is a cross-sectional view of a display device according to an embodiment of the present disclosure.

FIG. 28 is a cross-sectional view of a display device according to an substrate 210, a flexible substrate 220, a pixel array layer 230, a barrier film 240, a embodiment of the present disclosure.

FIG. 28 illustrates a display device 200 as being implemented as an organic light-emitting diode display device.

Referring to FIG. 28, the display device 200 may include a support heat dissipation film 250, a flexible film 260, a driving integrated circuit (IC) 270, and an anisotropic conductive film 280.

The support substrate 210, which is a substrate for supporting the flexible substrate 220, may be formed of plastic or glass. For example, the support substrate 210 may be formed of polyethylene terephthalate (PET). The flexible substrate 220 may be located on the top surface of the support substrate 210 and may be formed as a plastic film having flexibility. For example, the flexible substrate 220 may be formed as a polyimide film.

The pixel array layer 230 may be formed on the top surface of the flexible substrate 220. The pixel array layer 230 may be a layer having a plurality of pixels formed thereon to display an image.

The pixel array layer 230 may include a thin-film transistor layer, a light-emitting element layer, and an encapsulation layer. The thin-film transistor layer may include scan lines, data lines, and thin-film transistors. Each of the thin-film transistors includes a gate electrode, a semiconductor layer, and source and drain electrodes. In a case where a scan driver is formed directly on a substrate, the scan driver may be formed together with the thin-film transistor layer.

The light-emitting element layer is located on the thin-film transistor layer. The light-emitting element layer includes anodes, an emission layer, cathode electrodes, and banks. The emission layer may include an organic light-emitting layer comprising an organic material. For example, the emission layer may include a hole injection layer, a hole transport layer, an organic light-emitting layer, an electron transport layer, and an electron injection layer. The hole injection layer and the electron injection layer may be omitted. In response to voltages being applied to the anode electrodes and the cathode electrodes, holes and electrons move to the organic light-emitting layer through the hole transport layer and the electron transport layer, respectively, and may be combined together in the organic light-emitting layer, thereby emitting light. The light-emitting element layer may be a pixel array layer where pixels are formed, and a region where the light-emitting element layer is formed may be defined as a display area in which an image is displayed. An area on the periphery of the display area may be defined as a non-display area.

The encapsulation layer is located on the light-emitting element layer. The encapsulation layer reduces or prevents the infiltration of oxygen or moisture into the light-emitting element layer. The encapsulation layer may include at least one inorganic film and at least one organic film. The barrier film 240, which is for protecting the display device 200 against oxygen or moisture, is located on the encapsulation layer.

The barrier film 240 may cover the pixel array layer 230 to thus protect the pixel array layer 230 against oxygen or moisture. That is, the barrier film 240 may be located on the pixel array layer 230.

The heat dissipation film 250 may be located on the bottom surface of the support substrate 210. The heat dissipation film 250 may include a buffer member 251 performing a buffer function to protect the display device 200 against external impact, and may also include a metal layer 252 having a high thermal conductivity so as to be able to effectively dissipate heat generated by the display device 200. The metal layer 252 may be formed of copper (Cu), aluminum (Al), or aluminum nitride (AlN). In a case where the heat dissipation film 250 includes the buffer member 251 and the metal layer 252, the buffer member 251 may be located on the bottom surface of the support substrate 210, and the metal layer 252 may be located on the bottom surface of the buffer member 251.

The flexible film 260 may be a chip-on-film (COF) for mounting the driving integrated circuit 270. The driving integrated circuit 270 may be implemented as a chip for providing driving signals to the data lines of the pixel array layer 230. One side of the flexible film 260 may be attached onto the top surface of the flexible substrate 220 via an anisotropic conductive film 280. For example, one side of the flexible film 260 may be attached onto pads provided on a part of the top surface of the flexible substrate 220 that is not covered by the barrier film 240. Because these pads are connected to the data lines of the pixel array layer 230, the driving signals of the driving integrated circuit 270 may be provided to the data lines of the pixel array layer 230 via the flexible film 260 and the pads.

Figure 29:
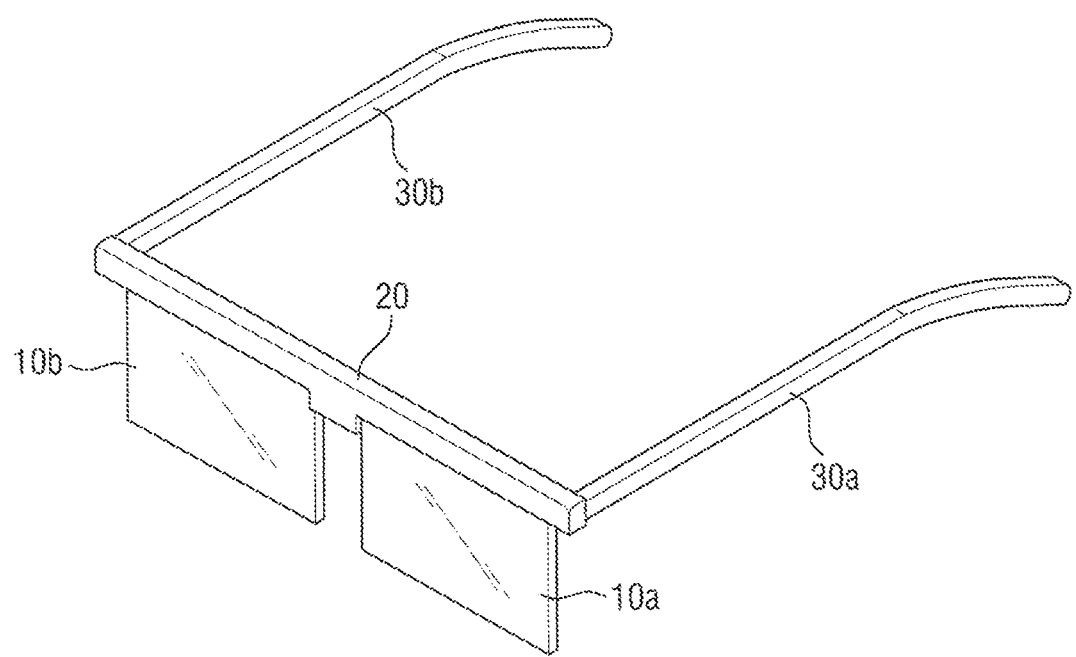
FIG. 29 is a perspective view of a head-mounted display including an augmented reality providing apparatus according to various embodiments of the present disclosure.

FIG. 29 is a perspective view of a head-mounted display including an augmented reality providing apparatus according to various embodiments of the present disclosure.

FIG. 29 shows that augmented reality providing apparatuses according to various embodiments of the present disclosure are applicable to a head-mounted display. Referring to FIG. 29, a head-mounted display according to an embodiment of the present disclosure includes a first augmented reality providing apparatus 10a, a second augmented reality providing apparatus 10b, a support frame 20, and eyewear temples, or arms, 30a and 30b.

FIG. 29 illustrates the head-mounted display according to an embodiment of the present disclosure as being eyeglasses including the eyewear temples 30a and 30b, but the head-mounted display according to an embodiment of the present disclosure may include, in the eyewear temples 30a and 30b, a band that can be worn on the head. However, the present disclosure is not limited to the example of FIG. 29, and augmented reality providing apparatuses according to various embodiments of the present disclosure are applicable to various electronic devices in various manners.

While embodiments of the present invention have been mainly described, they are merely examples and are not intended to limit the present invention, and it will be understood by those of ordinary skill in the art that various modifications and applications which are not illustrated above can be made without departing from the essential characteristics of the embodiments of the present invention. For example, the respective components which are illustrated in the embodiments of the present invention may be practiced with modifications. Further, the differences relating to such modifications and applications should be construed as being included in the scope of the invention as defined by the appended claims, with functional equivalents thereof to be included.

What is claimed is:

1. An augmented reality providing apparatus comprising:
  a lens comprising a first lens portion defining a first groove, and a second lens portion;
  a first reflective member in the first groove and having a concave shape;
  a second reflective member disposed within the second lens; and a display device on one side of the first lens portion for displaying a first image and a second image, wherein the first lens portion and the second lens portion are bonded to overlap in a thickness direction of the lens, and wherein the first reflective member reflects the first image at a first angle, and the second reflective member reflects the second image at a second angle that is different from the first angle.

2. The augmented reality providing apparatus of claim 1, wherein the first groove has a diameter of about 400 μm to about 2 mm.

3. The augmented reality providing apparatus of claim 2, wherein the first reflective member has a diameter of about 100 μm to about 5 mm.

4. The augmented reality providing apparatus of claim 3, wherein the first groove has a surface roughness of about 20 nm to about 40 nm.

5. The augmented reality providing apparatus of claim 3, wherein residual stress at an inflection point where the first groove and a top surface of the first lens portion meet is about 4 MPa to about 6 MPa.

6. The augmented reality providing apparatus of claim 1, further comprising a wherein the second lens portion overlapping with the first lens portion and defining defines a second groove.

7. The augmented reality providing apparatus of claim 6, further comprising a second reflective member in the second groove, and having a concave shape.

8. The augmented reality providing apparatus of claim 7, wherein the first and second reflective members are inclined at different angles.

9. The augmented reality providing apparatus of claim 8, further comprising a third lens portion overlapping with the first and second lens portions, and comprising a third reflective member having a flat shape.

10. The augmented reality providing apparatus of claim 9, wherein the first, second, and third reflective members have different diameters.

* * * * *

UNITED STATES PATENT AND TRADEMARK OFFICE
CERTIFICATE OF CORRECTION

| | |
|---|---|
| PATENT NO. | : 12,038,585 B2 |
| APPLICATION NO. | : 17/937709 |
| DATED | : July 16, 2024 |
| INVENTOR(S) | : Jeong Woo Park et al. |

It is certified that error appears in the above-identified patent and that said Letters Patent is hereby corrected as shown below:

In the Claims

In Column 26, Line 4, in Claim 6, before "wherein" delete "further comprising a".

In Column 26, Lines 4-5, in Claim 6, after "portion" delete "overlapping with the first lens portion and defining".

Signed and Sealed this
Third Day of December, 2024

Katherine Kelly Vidal
*Director of the United States Patent and Trademark Office*